US012631354B2

(12) United States Patent
Picardi et al.

(10) Patent No.: US 12,631,354 B2
(45) Date of Patent: May 19, 2026

(54) HVAC SERVICE PERFORMANCE

(71) Applicant: Alarm.com Incorporated, Tysons, VA (US)

(72) Inventors: Robert Nathan Picardi, Herndon, VA (US); Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 171 days.

(21) Appl. No.: 18/406,584

(22) Filed: Jan. 8, 2024

(65) Prior Publication Data

US 2024/0142127 A1 May 2, 2024

Related U.S. Application Data

(63) Continuation of application No. 17/865,472, filed on Jul. 15, 2022, now Pat. No. 11,874,007, which is a
(Continued)

(51) Int. Cl.
*F24F 11/37* (2018.01)
*F24F 11/64* (2018.01)
*G06N 3/08* (2023.01)

(52) U.S. Cl.
CPC ............... *F24F 11/37* (2018.01); *G06N 3/08* (2013.01); *F24F 11/64* (2018.01)

(58) Field of Classification Search
CPC ... F24F 11/37; F24F 11/64; G05B 2219/2614; G05B 23/0254; G05B 15/02; G06N 3/08
See application file for complete search history.

(56) References Cited

U.S. PATENT DOCUMENTS 3,628,346 A 12/1971 Lagrone, Jr.
4,999,730 A 3/1991 Pickard
(Continued)

FOREIGN PATENT DOCUMENTS

CN 101399565 4/2009
CN 101713801 5/2010
(Continued)

OTHER PUBLICATIONS

[No Author Listed], "Honeywell Building Management System, Section 19500, HVAC Instrumentation and Controls," Jun. 10, 2015, 26 pages.
(Continued)

*Primary Examiner* — Nelson J Nieves
(74) *Attorney, Agent, or Firm* — Fish & Richardson P.C.

(57) ABSTRACT

A monitoring system is configured to monitor a property. The system includes a sensor that is configured to generate sensor data that reflects an attribute of the property. The system further includes an HVAC system that is configured to generate and provide conditioned air to the property and that is configured to generate HVAC system data that reflects an attribute of the HVAC system. The system includes a monitor control unit that is configured to determine that the HVAC system is likely malfunctioning. The control unit is configured to receive the sensor data. The control unit is configured to determine that the HVAC system is likely operating correctly. The control unit is configured to determine a cause of the HVAC system transitioning from likely malfunctioning to likely operating correctly. The control unit is configured to update a model that is configured to identify causes of HVAC system malfunctions.

20 Claims, 6 Drawing Sheets

Related U.S. Application Data continuation of application No. 16/752,249, filed on Jan. 24, 2020, now Pat. No. 11,391,479.

(60) Provisional application No. 62/796,227, filed on Jan. 24, 2019.

(56) References Cited

U.S. PATENT DOCUMENTS

| | | | |
|---|---|---|---|
| 5,819,203 | A | 10/1998 | Moore et al. |
| 7,891,574 | B1 | 2/2011 | Kennedy et al. |
| 9,447,983 | B2 | 9/2016 | Smith et al. |
| 9,551,504 | B2 | 1/2017 | Arensmeier et al. |
| 9,645,017 | B2 | 5/2017 | Kramer et al. |
| 9,696,055 | B1 | 7/2017 | Goodman et al. |
| 9,829,871 | B1 | 11/2017 | Goodman et al. |
| 9,879,875 | B2 | 1/2018 | Quam et al. |
| 10,274,382 | B1 | 4/2019 | Trundle |
| 10,845,079 | B1 | 11/2020 | Picardi et al. |
| 2010/0106310 | A1 | 4/2010 | Grohman |
| 2010/0245103 | A1 | 9/2010 | Plaisted et al. |
| 2011/0047418 | A1 | 2/2011 | Drees |
| 2011/0112875 | A1* | 5/2011 | Johnson ............... G06Q 10/063 705/7.11 |
| 2011/0118896 | A1 | 5/2011 | Holloway |
| 2012/0072029 | A1 | 3/2012 | Persaud et al. |
| 2012/0143356 | A1 | 6/2012 | Berg-Sonne et al. |
| 2012/0185728 | A1 | 7/2012 | Guo et al. |
| 2013/0158714 | A1 | 6/2013 | Barton et al. |
| 2013/0158720 | A1 | 6/2013 | Zywicki et al. |
| 2014/0262130 | A1 | 9/2014 | Yenni et al. |
| 2014/0266755 | A1 | 9/2014 | Arensmeier et al. |
| 2014/0303751 | A1 | 10/2014 | Ibrahim et al. |
| 2015/0168003 | A1 | 6/2015 | Stefanski et al. |
| 2016/0146493 | A1 | 5/2016 | Ettl et al. |
| 2016/0209061 | A1 | 7/2016 | Castillo et al. |
| 2017/0004508 | A1 | 1/2017 | Mansfield et al. |
| 2017/0153038 | A1* | 6/2017 | Wootton .................. F24F 11/48 |
| 2017/0206615 | A1 | 7/2017 | Sloop et al. |
| 2017/0292725 | A1 | 10/2017 | Conley et al. |
| 2017/0328625 | A1 | 11/2017 | Fujimoto et al. |
| 2018/0109906 | A1 | 4/2018 | Sentz et al. |
| 2018/0121808 | A1 | 5/2018 | Ramakrishna et al. |
| 2018/0202681 | A1* | 7/2018 | Kim ......................... F24F 11/38 |
| 2018/0343150 | A1 | 11/2018 | Vaughn et al. |
| 2019/0195525 | A1 | 6/2019 | Varghese et al. |
| 2019/0213446 | A1 | 7/2019 | Tsou et al. |
| 2019/0264936 | A1* | 8/2019 | Bailey ...................... F24F 11/65 |
| 2022/0035356 | A1* | 2/2022 | Kudo ................. G05B 23/0254 |

FOREIGN PATENT DOCUMENTS

| | | |
|---|---|---|
| CN | 103795773 | 5/2014 |
| CN | 103401254 | 3/2015 |
| JP | 2013518556 | 5/2013 |
| WO | WO 2017004386 | 1/2017 |

OTHER PUBLICATIONS

International Preliminary Report on Patentability in International Appln. No. PCT/US2020/015014, mailed on Aug. 5, 2021, 8 pages.
International Search Report and Written Opinion in International Appln. No. PCT/US2020/015014, mailed on Jun. 2, 2020, 13 pages.
LBNL Facilities Master Specifications, "Section 255000—Facilities Monitoring and Control System (FMCS)," Mar. 28, 2013, 60 pages.
Office Action in European Appln. No. 20708328.8, mailed on May 4, 2023, 5 pages.
rr-heating-air.com [online], "5 Reasons You Need Seasonal HVAC Changeover from R & R Heating & Air," Jan. 29, 2014, retrieved on Feb. 5, 2018, retrieved from: URL<https://web.archive.org/web/20140129142422/http://www.rr-heating-air.com/seasonal-hvac-changeoveri>, 3 pages.

\* cited by examiner

200

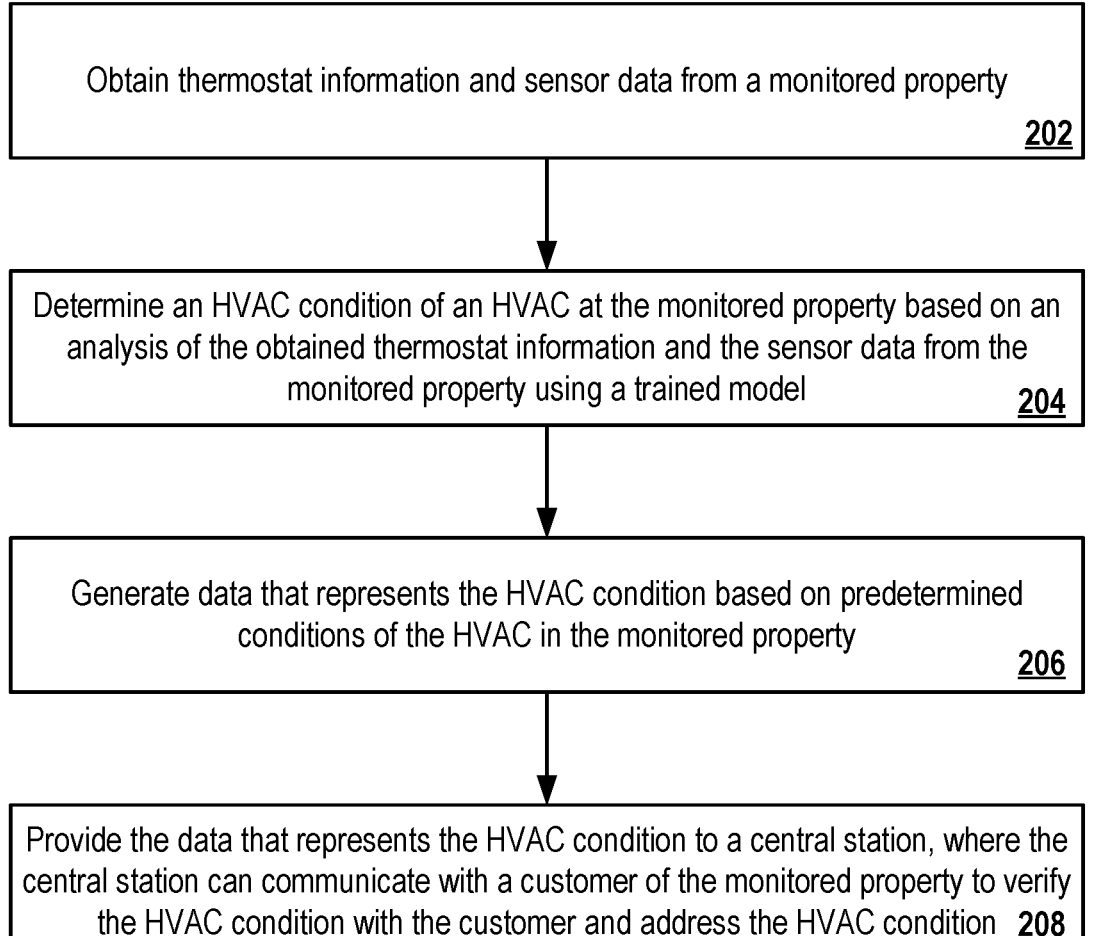

Obtain thermostat information and sensor data from a monitored property
202

Determine an HVAC condition of an HVAC at the monitored property based on an analysis of the obtained thermostat information and the sensor data from the monitored property using a trained model          204

Generate data that represents the HVAC condition based on predetermined conditions of the HVAC in the monitored property
206

Provide the data that represents the HVAC condition to a central station, where the central station can communicate with a customer of the monitored property to verify the HVAC condition with the customer and address the HVAC condition  208

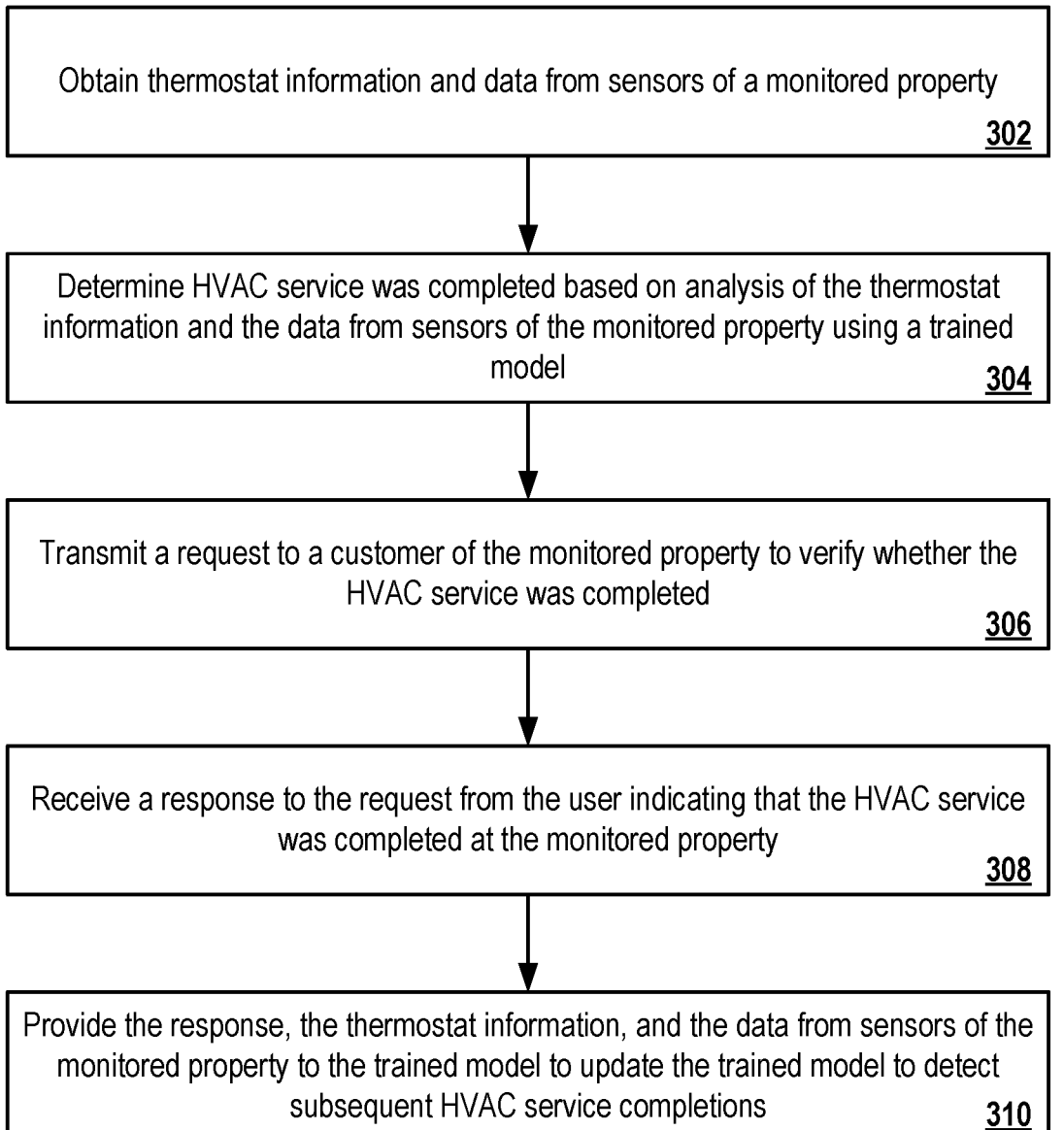

Obtain thermostat information and data from sensors of a monitored property

<u>302</u>

Determine HVAC service was completed based on analysis of the thermostat information and the data from sensors of the monitored property using a trained model      <u>304</u>

Transmit a request to a customer of the monitored property to verify whether the HVAC service was completed <u>306</u>

Receive a response to the request from the user indicating that the HVAC service was completed at the monitored property <u>308</u>

Provide the response, the thermostat information, and the data from sensors of the monitored property to the trained model to update the trained model to detect subsequent HVAC service completions      <u>310</u>

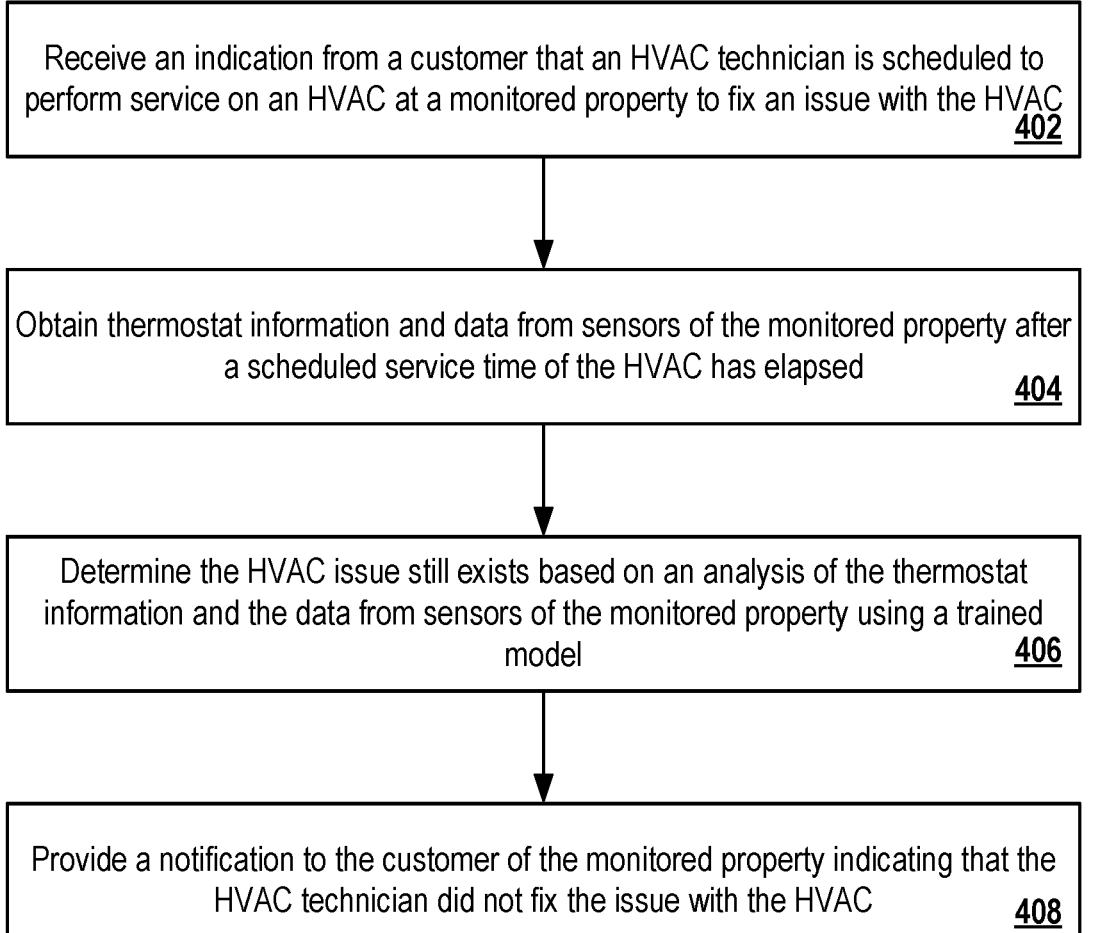

Receive an indication from a customer that an HVAC technician is scheduled to perform service on an HVAC at a monitored property to fix an issue with the HVAC 402

Obtain thermostat information and data from sensors of the monitored property after a scheduled service time of the HVAC has elapsed 404

Determine the HVAC issue still exists based on an analysis of the thermostat information and the data from sensors of the monitored property using a trained model 406

Provide a notification to the customer of the monitored property indicating that the HVAC technician did not fix the issue with the HVAC 408

FIG. 4

HVAC SERVICE PERFORMANCE

CROSS-REFERENCE TO RELATED APPLICATIONS

This application is a continuation of U.S. application Ser. No. 17/865,472, filed Jul. 15, 2022, which is a continuation of U.S. application Ser. No. 16/752,249, filed Jan. 24, 2020, now U.S. Pat. No. 11,391,479, issued Jul. 19, 2022, which claims the benefit of U.S. Application 62/796,227, filed Jan. 24, 2019. The disclosure of each of the foregoing applications is incorporated herein by reference.

TECHNICAL FIELD

This specification relates generally to HVAC analytics technology.

BACKGROUND

Heating, Ventilation, and Air Conditioning (HVAC) systems are used to provide thermal comfort and acceptable indoor air quality to residential or commercial facilities. Typically, HVAC systems exchanges or replaces air in a space to remove unpleasant smells, remove excessive moisture, maintain air circulation, and prevent stagnation of the interior air.

SUMMARY

The subject matter of the present disclosure is related to the techniques for addressing heating, ventilation, and air conditioning (HVAC) alerts detected by a security system that utilizes one or more machine-learning models. The machine-learning model can detect and identify one or more alerts in a monitored property and take action to resolve the various types of alerts. In particular, the machine-learning model can utilize data provided from the monitored property (e.g., such as sensor data, product data, thermostat data, and data corresponding to the HVAC system) to detect whether a condition exists with the HVAC system. This will give homeowners peace of mind as their HVAC system is automatically monitored for HVAC problems that can be detected, identified, and addressed without the user performing any work. In response to the machine-learning model detecting an issue with the HVAC system, the security system can generate a classification based on the output of the machine-learning model. The security system can provide the classification to an external residential security service, such as a central station, that monitors one or more residential properties in a particular area. The central station can address the classification received from the security system to resolve the HVAC issue of the monitored property.

The central station can reach out to the owner of the monitored property to alert the owner of the monitored property regarding the HVAC issue. In particular, a user at the central station can contact the owner to discuss the HVAC issue. Once the owner at the monitored property confirms of the HVAC issue, the central station can contact one or more HVAC contractors to dispatch an HVAC technician to the monitored property to address the HVAC issue. The central station can also log the classification received by the security system to identify similar issues corresponding to other properties in its area.

In some implementations, the security system can detect when a service has been performed at the monitored property. In particular, the security system can use its machine-learning model to detect monitored properties that have transitioned from an issue status to a healthy performance status. For example, the security system can use its machine-learning model to analyze whether an HVAC system has had its thermostat module fixed. The machine-learning model can receive output from the monitored property that includes sensor data, product data, data from the HVAC system, and data from the owner of the monitored property to produce an output that indicates whether the monitored property has transitioned from the issue status to the healthy performance status. Additionally, the security system can communicate with the owner of the monitored property by requesting through the owner's client device. In response to receiving the owner's input (e.g., whether an HVAC technician performed a service on an HVAC system), the security system can provide the input from the owner as well the sensor data from the monitored property to refine and retrain the machine-learning model. In addition, the security system can verify through the owner that the scheduled service request for the monitored property resulted in a repaired component in the monitored property (e.g., such as a repaired HVAC system.) The security system can assess the productivity of the service performed by the HVAC technician on the HVAC system. The security system may record service times received from an owner or HVAC technician in order to assist with assessing the HVAC system performance before and after the visit and determine how affective the visit was. This information is valuable to the homeowner and the dealer, and can be used as a metric to rate the performance of an HVAC technician.

According to an innovative aspect of the subject matter described in this specification, a monitoring system is configured to monitor a property. The monitoring system includes a sensor that is configured to generate sensor data that reflects an attribute of the property; an HVAC system that is configured to generate and provide conditioned air to the property and that is configured to generate HVAC system data that reflects an attribute of the HVAC system; and a monitor control unit. The monitor control unit is configured to receive, during a first time period, one or more first samples of HVAC system data; based on the one or more first samples of HVAC system data, determine that the HVAC system is likely malfunctioning; receive, during a second time period that is after the first time period, the sensor data; receive, during a third time period that is after the second time period, one or more second samples of HVAC system data; based on the one or more second samples of HVAC system data, determine that the HVAC system is likely operating correctly; based on the sensor data, determine a cause of the HVAC system transitioning from likely malfunctioning to likely operating correctly; and update a model that is configured to identify causes of HVAC system malfunctions using data indicating the cause of the HVAC system transitioning from likely malfunctioning to likely operating correctly.

These and other implementations can each optionally include one or more of the following features, alone or in combination. The monitor control unit is configured to receive, during a fourth time period that is after the third time period, one or more third samples of HVAC system data; based on the one or more third samples of HVAC system data, determine that the HVAC system is likely malfunctioning; provide the one or more third samples of HVAC system data as an input to the model; and receive, from the model, data indicating a likely cause of the HVAC system is malfunctioning. The monitor control unit is configured to determine the cause of the HVAC system transitioning from malfunctioning to operating correctly by determining that an individual repaired the HVAC system; and update the model that is configured to identify causes of HVAC system malfunctions using the data indicating the cause of the HVAC system transitioning from malfunctioning to operating correctly by updating the model using data indicating that the individual repaired the HVAC system. The monitor control unit is configured to determine that the individual repaired the HVAC system by analyzing the sensor data; and, based on the sensor data, determining that the attribute of the property did not match activity patterns of a resident of the property.

The monitor control unit is configured to determine that the individual repaired the HVAC system by receiving, from a resident of the property, data confirming that an individual repaired the HVAC system. The monitor control unit is configured to determine the cause of the HVAC system transitioning from malfunctioning to operating correctly by determining that no repair to the HVAC system was performed; and update the model that is configured to identify causes of HVAC system malfunctions using the data indicating the cause of the HVAC system transitioning from malfunctioning to operating correctly by updating the model using data indicating that no repair to the HVAC system was performed. The monitor control unit is configured to determine that no repair to the HVAC system was performed by analyzing the sensor data; and, based on the sensor data, determining that a window or door of the property was open for at least a threshold period of time. The monitor control unit is configured to, based on determining that the HVAC system is likely malfunctioning, provide, for output, a request for a repair to be performed on the HVAC system. The monitor control unit is configured to, based on determining that the HVAC system is likely malfunctioning, initiate a communication with a resident of the property. The model includes one or more neural networks and is trained using machine learning.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flowchart of an example process for notifying a central station of an HVAC condition at the monitored property based on obtained sensor data from the monitored property.

FIG. 3 is a flowchart of an example process for using a trained model to determine whether an HVAC service was completed and verifying the results of the trained model.

FIG. 4 is a flowchart of an example process for determining whether an HVAC issue still exists after receiving an indication that an HVAC technician is scheduled to fix the HVAC issue.

DETAILED DESCRIPTION

Figure 1A:
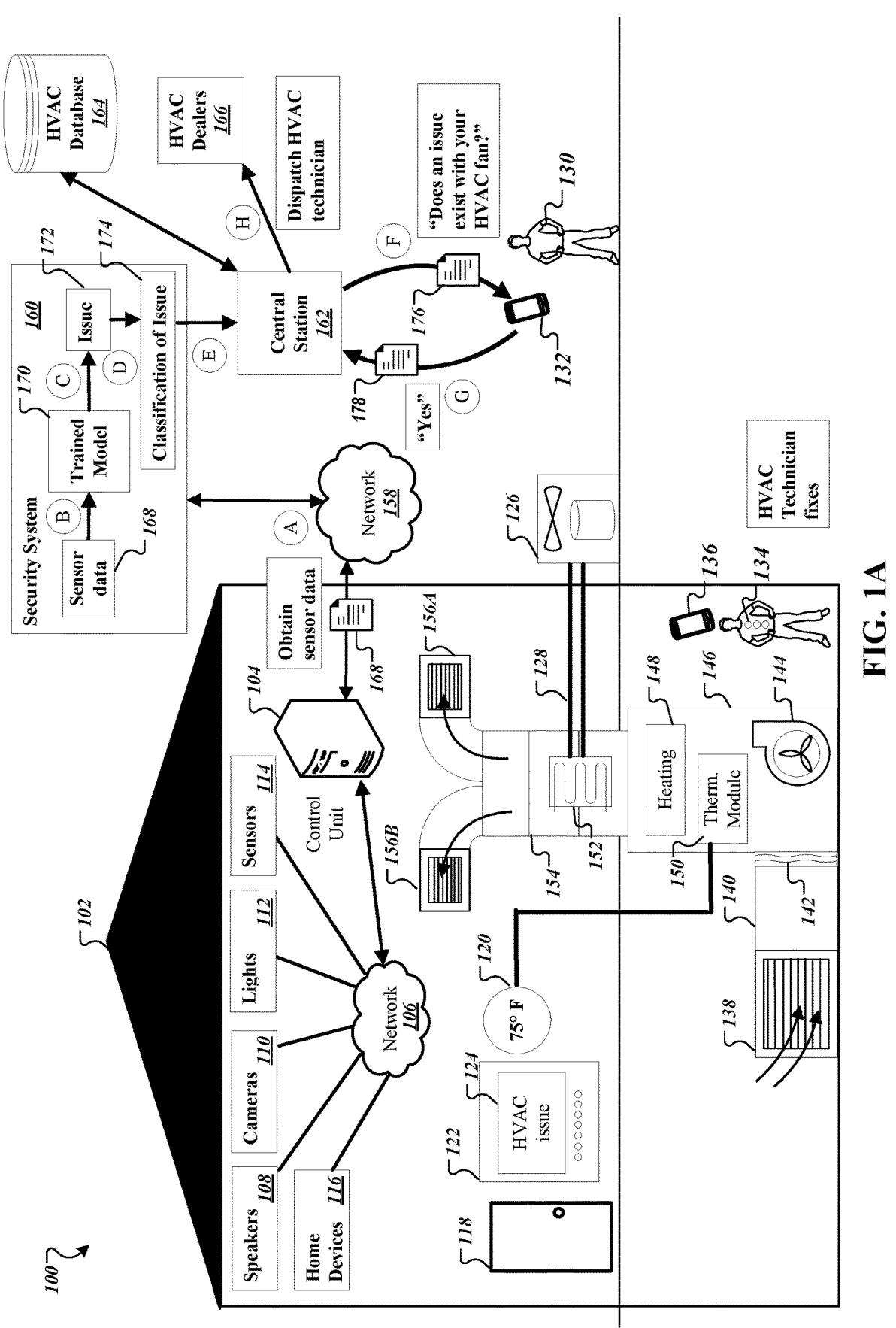
FIG. 1A is a contextual diagram of an example system for monitoring HVAC services in a monitored property.

FIG. 1A is a contextual diagram of an example system 100 for monitoring HVAC service in a monitored property 102. Though system 100 is shown and described including a particular set of components including a control unit server 104, a network 106, speakers 108, camera 110, lights 112, sensors 114, home devices 116, air conditioner (or outdoor compressor) 126, HVAC system 146, network 158, security system 160, central station 162, HVAC database 164, and HVAC dealers 166 the present disclosure need not be so limited. For instance, in some implementations the integrated security environment for monitoring the HVAC system 146 of the monitored property may use only a subset of the aforementioned components. As an example, there may be implementations that do not use the speakers 108. Similarly, there may be implementations that the security system 160 is stored in the control unit server 104. The central station 162 can also be stored in the control unit server 104, instead of separate from the control unit server 104. Yet, other alternative exemplary systems also fall within the scope of the present disclosure such as a system that does not use a control unit server 104. For these reasons, the system 100 should not be viewed as limiting the present disclosure to any particular set of necessary components.

As shown in FIG. 1A, a monitored property 102 owned by owner 130 is monitored by a control unit server 104 that includes components within the monitored property 102. The integrated security system 100 further includes an alarm panel 122 with a message display 124, a thermostat 120, and an HVAC system 146, which includes a return air duct 138, air duct 140, an air filter 142, a fan 144, a thermostat module 150, a heating module 148, an evaporator coil 152, air handling unit 154, refrigerant filled tubing 128, and supply air ducts 156A and 1568. The thermostat 120 displays a temperature to set the temperature of the monitored property 102. The return air duct 138 includes a duct to carry air from a conditioned air space in the monitored property, such as in the monitored property 102, to the air duct 140. The air filter 142 includes a porous device that can be used to remove impurities or solid particles from the air in the monitored property 102 that passes through the air duct 140. The fan 144 includes a mechanical device that creates a current of air, such as with the use of a fan, to move air through the monitored property 102.

The thermostat module 150 is a device within the HVAC system 146 used to receive commands from the thermostat 120 and to convert the commands into instructions, instructing the HVAC system 146 to move the temperature of monitored property 102 to a set temperature set by the thermostat 120. The heating module 148 produces heat to provide to the monitored property 102 through the HVAC system 146. The evaporator coil 152 sits on top of the heating module 148 and can be used to cool air inside the monitored property 102. For example, the heating module 148 can warm the air provided by the fan 144 and can pass the warm air to over the evaporator coil 152. The air that is provided from the fan 144 and moved through the heating module 148 cools as it passes over the evaporator coil 152 because heat from the air transfers to the refrigerant in the refrigerant filled tubing 128. The refrigerant filled tubing 128 circulates refrigerant between the outdoor compressor 126 and the evaporator coil 152. The outdoor compressor (e.g., air compressor) 126 removes heat from the refrigerant, supplies air or other gas at increased pressure to the HVAC system 146, and uses a fan to create a current of air. The air handling unit 154 includes a device to condition and circulate air as part of the heating, ventilating, and air-conditioning process for the HVAC system 146. The supply air ducts 156A and 156B can provide resultant air from the HVAC system 146 to particular rooms throughout the monitored property 102.

Additionally, the components within the monitored property 102 may include one or more speakers 108, one or more cameras 110, one or more lights 112, one or more sensors 114, and one or more home devices 116. The one or more cameras 110 may include video cameras that are located at the exterior of the monitored property 102 near the front door 118, as well as located at the interior of the monitored property 102 near the front door 118. For example, a video camera may be placed in the basement of the monitored property 102 for visually monitoring the HVAC system 146 and send the images or video to the control unit server 104 to send to a client device 132 owned by the owner 130. The one or more sensors 114 can include a motion sensor located at the exterior of the monitored property 102, a front door sensor that is a contact sensor positioned at the front door 118, a pressure sensor that receives button presses at a light device, an air flow sensor included in the air duct 140 or the air handling unit 154, and a lock sensor that is positioned at the front door 118 and each window within the monitored property. The contact sensor may sense whether the front door 118 or the windows is in an open position or a closed position. The lock sensor may sense whether the front door 118 and each window is in an unlocked position or a locked position. The airflow sensor may sense whether air is flowing through the HVAC system 146 when turned-on to either heat or cool the monitored property 102. The one or more home devices 116 may include home appliances such as a washing machine, a dryer, a dishwasher, an oven, a stove, a microwave, and a laptop, to name a few examples. The one or more home devices 116 may also include a humidity sensor that monitors an amount of humidity in each room of the monitored property 102. The control unit server 104 can adjust how much sun light is let in to the monitored property 102 by adjusting a movement of shades covering each of the windows in the monitored property 102. Additionally, if the monitored property 102 is a commercial facility, the one or more home devices 116 included in the commercial facility may include a printer, a copier, a vending machine, and a fax machine to name a few examples.

The control unit server 104 communicates over a wired or wireless connection over network 106 with connected devices such as each of the one or more speakers 108, one or more cameras 110, one or more lights 112, one or more sensors 114, and one or more home devices 116 (washing machine, a dryer, a dishwasher, an oven, a stove, a microwave, a laptop, etc.) to receive sensor data descriptive of events detected by the one or more speakers 108, the one or more cameras 110, the one or more lights 112, the one or more sensors 114, and the one or more home devices 116 in the monitored property 102. In some implementations, each of the connected devices may connect via Wi-Fi, Bluetooth, or any other protocol used to communicate over network 106 to the control unit server 104. The one or more speakers 108, the one or more cameras 110, the one or more lights 112, the one or more sensors 114, and the one or more home devices 116 can communicate with the security system 160 over the network 158 and bypass the control unit server 104.

Additionally, the control unit server 104 can communicate over a long-range wired or wireless connection with a security system 160 over network 158. In some implementations, the security system 160 is located remotely from the monitored property 102. In other implementations, the security system 160 is located locally at the monitored property 102 within the control unit server 104. The security system 160 communicates bi-directionally with the control unit server 104. Specifically, the security system 160 receives sensor data descriptive of events detected by the sensors included in the monitoring system of the monitored property 102. Additionally, the security system 160 can transmit instructions to the control unit server 104 for particular events. The control unit server 104 and the security system 160 can also communicate directly with a central station 162.

The central station 162 can monitor the monitored property 102, as well as other (and, perhaps, many more properties), monitoring systems located at different monitored properties that are owned by various users. For example, the central station 162 can monitor many monitored properties by zip code, county, or city. In other implementations, the central station 162 can monitor monitored properties within a neighborhood. The central station 162 can also communicate with the HVAC dealers 168 as well as the HVAC database 164.

The central station 162 can communicate with an HVAC database 164. The HVAC database 164 can include one or more tables relatable to data corresponding to HVAC systems of the central station 162's monitored properties. The one or more tables can include data describing issues of HVAC systems, failure data of HVAC systems, data corresponding to HVAC systems that have changed from an issue state to a healthy state, and data corresponding to HVAC systems that have changed from a health state to an issue state. The tables can store sensor data from a corresponding monitored property for each of these issues. The tables can also store classification label data corresponding to types of issues generated by the security system 160. For example, these issues can correspond to broken components, such as, broken thermostats, unresponsive burners, unresponsive air compressors, an unresponsive air compressor 126, lack of refrigerant in the refrigerant filled tubing 128, broken fan 144, broken evaporator coil 152, and low battery power, to name a few examples. The HVAC database 164 can also store indications when these issues have been fixed. These indications can include determining that a HVAC technician has fixed the issue by sensor (and storing the corresponding sensor data), notifications from owners that the HVAC technician is scheduled to work on the issue, contact information corresponding to the owners of the monitored properties, record logs of data showing the central station 162 contacting the owner, and transcriptions of the conversations between users at the central station 162 and an homeowner of the monitored property. The HVAC database 164 can also store raw sensor data corresponding to the monitored properties when these issues occur. For example, the raw sensor data can include motion detector data, proximity data, thermal data, and data from the house products, when one of these issues are detected by the control unit server 104. The HVAC database 164 can receive this data corresponding to HVAC issues from the control unit server 104 at the monitored property 102 and other monitored properties with an HVAC system.

The HVAC database 164 can also receive thermostat data from a thermostat of a monitored property, such as thermostat 120 from monitored property 102. For example, the thermostat information may comprise a current temperature, an operating state of the thermostat, information based on changes of operating state of the thermostat such as when the thermostat is instructed to turn on and turn off, set points of the thermostat indicating target temperature, as well as outdoor temperature at the time of a broken HVAC system, and whether auxiliary heat is included in the monitored property 102. Additionally, the thermostat information may include energy information associated with the HVAC system 146, a power usage associated with the HVAC system 146, a humidity level of the monitored property 102, and various temperature readings from around the monitored property 102. Additionally, the control unit server 104 can tag the thermostat information from the thermostat 120 before providing the thermostat information through the central station 162 to the HVAC database 164. For example, the tags can indicate whether the data from the thermostat corresponds to an HVAC system in an unhealthy state, a healthy state, a maintenance operation state, and an off state. This will allow the HVAC database 164 to store the raw sensor data and the thermostat data appropriately. The HVAC database 164 can also store outdoor temperature data corresponding to a particular monitored property. Thus, when the control unit server 104 provides temperature data within the monitored property 102, the control unit server 104 can also provide outdoor temperature and humidity information corresponding to the monitored property 102. The outdoor temperature data can be provided to the HVAC database 164 and stored when the HVAC system is in an unhealthy state, a healthy state, a maintenance state, an off state, as the system transitions from an unhealthy state to the healthy state, and as the system transitions from the healthy state to the unhealthy state. The data stored in the HVAC database 164 can be fed into a machine-learning algorithm at the security system 160.

In some implementations, the security system 160 can store, train, and manage a machine-learning algorithm. The machine-learning algorithm can also be stored on the HVAC database 164. The machine-learning algorithm can be used to perform a variety of tasks. For example, the machine-learning algorithm can be trained by the control unit server 104 (or by the security system 160) to detect and identify issues associated with the HVAC system 146. For example, the security system 160 can use a machine-learning algorithm, such as a deep learning algorithm, an anomaly detecting algorithm, a linear regression algorithm, or a logical regression algorithm, or a combination of various machine-learning algorithms, to name a few examples.

The security system 160 can train the machine-learning algorithm to perform a variety of tasks. For example, the security system 160 can train its stored machine-learning algorithm to identify failures corresponding to HVAC systems. The security system 160 can provide previous failure data along with corresponding timestamps to a machine-learning algorithm. The failure data can include indications that an HVAC system has failed, data showing broken components of a failed HVAC system, and raw sensor data that monitors the HVAC system around the time the HVAC system failed. The machine-learning algorithm can use this training data to generate a trained model that identifies and detects failed HVAC systems. Additionally, the security system 160 can train the machine-learning algorithm using data that shows healthy HVAC systems. This helps the trained machine-learning algorithm to distinguish between healthy and non-healthy HVAC systems.

The security system 160 can also train the machine-learning algorithm to detect and identify HVAC systems that have transitioned from an issue status to a healthy status. This indication produced by the machine-learning algorithm can indicate when HVAC service was performed in a monitored property. For example, the security system 160 can use data over a period of time that shows an HVAC system transitioning between an issue status and a healthy status. The data can include thermostat data over a period, such as 5 hours, outdoor temperature data over the period of time, and raw sensor data monitoring the HVAC system 146. The raw sensor data can be media data (e.g., video and photos) from one or more cameras that monitor the HVAC system, audio data from microphones listening to the sounds produced by the HVAC system, thermal imaging data from thermal sensors that monitor the HVAC system, data from the alarm panel 122 that show issues with the HVAC system 146, motion data from motion sensors surrounding the HVAC system 146, and lock sensor data from doors containing the HVAC system 146. Other sensor data can be provided from the monitored property. Additionally, the security system 160 can use data from house products to train the machine-learning algorithm. For example, the security system 160 can use data from outdoor temperature sensors, outdoor barometers, temperatures of various products in the monitored property 102, and data from a client device of the owner of the monitored property 102. The security system can also add the timestamp data to this transitioning training data to predict likelihoods that the system has transitioned from an issue state to a healthy state to predict likelihoods of transitions at particular times of the day. The training can be further based on HVAC systems at other monitored properties that have similar components. The training can include how long it takes for an HVAC system to transition to a health state after an issue has been detected.

The trained machine-learning algorithm can produce a likelihood that an HVAC system has transitioned between an issue status to a healthy status. The likelihood can be statistical likelihoods, such as percentages, that indicate how likely it is that the HVAC system has transitioned to a healthy state from the issued state. This information can be used to verify with the homeowner that a service was performed on the HVAC system and retrain the machine-learning algorithm if the service was not actually performed. Additionally, the security system 160 can retrain the machine-learning algorithm if the service was performed with additional HVAC system data and raw sensor data to fine tune the machine-learning algorithm.

In some implementations, after the security system 160 has trained the machine-learning algorithm to a point that the machine-learning algorithm can correctly identify issues and detect HVAC systems that transitions between an issue state and a healthy state, the security system 160 generates a trained model 170. The security system 160 can keep a copy of the trained model 170 in its memory as well as provide a copy of the trained model 170 to the control unit server 104 at the monitored property 102. The trained model 170 can execute at the control unit server 104 to quickly generate a notification of an issue or notification of an HVAC system that has transitioned between an issue state and a health state. The trained model 170 at the control unit server 104 can monitor the data from the HVAC system 146, the speakers 108, the microphones, the cameras 110, the lights 112, the sensors 114, the thermostat 120, and the home devices 116. In response to providing the data from each of the devices in the monitored property 102 to the trained model 170, the trained model 170 can produce an output based on its detection. For example, the output can indicate a predicted likelihood of an issue existing or indicate a predicted likelihood of an HVAC system that has transitioned between an issue state to a healthy state. Alternatively, this step is performed on the security system 160. Based on the issue, the control unit server 104 can transmit a notification to the client device 132 of the owner 130. The trained model 170 can also receive thermostat information corresponding to thermostat 120. The thermostat information can include current temperature of the thermostat, an operating state of the thermostat, information based on changes of operating state of the thermostat such as when the thermostat is instructed to turn on and turn off, set points of the thermostat indicating target temperature, as well as a current outdoor temperature to search for and detect patterns of a failed HVAC system 146.

The trained model 170 can not only predict if there is an issue with the HVAC system 146, but can also indicate if a particular component of the HVAC system 146 that may be at issue. For example, based on the data input to the trained model 170, the trained model 170 can produce an indication that an issue exists with the component of the HVAC system 146, such as the return air duct 138, air duct 140, the air filter 142, the fan 144, the thermostat module 150, the heating module 148, the evaporator coil 152, air handling unit 154, refrigerant filled tubing 128, and supply air ducts 156A and 156B. The trained model 170 can produce an error of the component type that appears to be broken by training the trained model 170 with raw sensor data and data from the HVAC system 146 that shows a particular component on the HVAC system 146 is in fact broken or not working properly.

As illustrated in system 100, the trained model 170 can also execute on the security system 160. The security system 160 can input data from monitored property 102 and data from the HVAC database 164 to determine, based on analyzing trends with the input information, whether an issue associated with the HVAC system 146 has occurred or whether the HVAC system 146 has transitioned from an issue state to a healthy state. The issue can include a predicted likelihood that the HVAC system 146 has failed and which particular component of the HVAC system 146 has failed. Alternatively, the trained model 170 can produce an indication that the particular component, such as the fan 144, has now been fixed. This transition can indicate that an HVAC technician or another user has fixed the HVAC system 146 or that a potential issue never existed. The security system 160 or the control unit server 104 can reach out to the user, such as owner 130, to determine if an issue actually exists or if a service was performed. If the user confirms of the issue or that the service was performed, the security system 160 or the control unit server 104 (or both) can retrain the trained model 170 in response to receiving the user's answer along with raw sensor data and the type of detection.

The benefit of having the trained model 170 on both the control unit server 104 and the security system 160 is to ensure that both models on each system produce similar results when receiving information from the monitored property 102. Should the trained model 170 on the control unit server 104 (or at the security system 160) detect a failure associated with the HVAC system 146 using the obtained thermostat information and other data from the monitored property 102 and the trained model 170 located at the other location not detect a failure with similar input data, the security system 160 and the control unit server 104 can communicate with one another to resolve the difference. In some implementations, each time the trained model 170 at one of the locations outputs an indication of a failure or success corresponding to the HVAC system 146, the control unit server 104 and the security system 160 communicate with one another to determine if the two systems result in similar outputs. For example, the control unit server 104 provides input to its trained model 170 to produce an error indicating a failure associated with the HVAC system 146. In response, the control unit server 104 can provide the detected HVAC failure and the input data to the security system 160 via the network 158. If the security system 160 determines its trained model 170 produces a different output with the same input as the control unit server 104's trained model 170, then the security system 160 can train its trained model 170 to detect that particular failure as detected by the trained model 170 at the control unit server 104. This functionality also works in the reverse, where the security system 160's trained model 170 detects an HVAC failure and the control unit server 104's trained model 170 does not.

In some implementations, the trained model 170 may run at both the control unit server 104 and at the security system 160 when the owner 130 leaves the monitored property 102. In the example shown in FIG. 1A, an owner 130 may prepare to leave the monitored property 102. In doing so, the owner 130 may turn off each of the one or more lights 112, turn off each of the one or more home devices 116, lock the front door 118, and close and lock each of the one or more windows. In some implementations, the owner 130 may interact with a client device 132 to activate a signature profile, such as "arm home" for the monitored property 102. The client device 132 may display a web interface, an application, or a device specific for a smart home system. The client device 132 can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 132 may communicate with the control unit server 104 using the network 106. The client device 132 may also communicate with the security system 160 using the network 158 through the application of the smart home system. The networks 106 and 158 may be wired or wireless or a combination of both and can include the Internet.

In some implementations, the owner 130 may communicate with the client device 132 to activate a signature profile for the monitored property 102. To illustrate, the owner 130 may first instruct the control unit server 104 to set a signature profile for arming the monitored property 102. For example, owner 130 may use a voice command to say "Smart Home, Arm Home." The voice command may include a phrase, such as "Smart Home" to trigger the client device 132 to actively listen to a command following the phrase. Additionally, the phrase "Smart Home" may be a predefined user configured term to communicate with the client device 132. The client device 132 can send the voice command to the control unit server 104 over the network 106. The control unit server 104 may notify the security system 160 that monitored property 102 is to be armed. In addition, the control unit server 104 may set parameters to arm the monitored property 102 in response to receiving the voice command. Moreover, the control unit server 104 can send back a confirmation to the client device 132 in response to arming the monitored property 102 and setting the armed parameters. For example, the control unit server 104 may send back a response to display a message on the client device 132 that says "home armed."

The importance of setting the signature profile indicates to the control unit server 104 who to contact in case the trained model 170 detects an issue with one or more components of the HVAC system 146. For example, once the armed home signature profile is set, the control unit server 104 immediately sends a notification to the client device 132 of the owner 130. The indication signifies to the client device 132 to display a message to the owner 130 that the monitored property 102 is armed. Should the trained model 170 produce an error corresponding to the HVAC system 146, the control unit server 104 provides that detected error notification to the client device 132 of the owner 130. Additionally, the control unit server 104 provides the error to the security system 160 to verify it produces the same error. Alternatively, the control unit server 104 can provide the raw sensor data to the security system 160 to determine if an error exists with the HVAC system 146.

In some implementations, upon the trained model 170's detection of a failure with the HVAC system 146 at either the control unit server 104 or the security system 160, both the control unit server 104 and the security system 160 log the detection of the failure of the HVAC system 146 along with a timestamp in memory. Thus, a user, such as the owner 130 or an HVAC technician 134, can review the logs at a later point in time to review the output of the trained model 170.

In some implementations, when the security system 160's trained model 170 generates an output or a likelihood of an output, the security system 160 proceeds to classify the output. The classification of the output can be a particular label that describes the output. The control unit server 104 can also classify the output in a similar manner to the security system 160. For example, the classification can be a code, a textual description, a category, a sub-category, or a number that represents a type of the error of the HVAC system 146. The classification can describe the output that represents the issue with the HVAC system 146. For example, the classification can describe a heating issue, a cooling issue, a filter issue, an issue with each of the one or more components, such as a blocking of the return air duct 138, a blocking of the air duct 140, and an old air filter 142. Other issues can include a broken fan 144, a broken thermostat module 150, a broken heating module 148, an old evaporator coil 152, an old air handling unit 154, no refrigerant found in the refrigerant filled tubing 128, and a blocking of the supply air ducts 156A and B. Other issues can correspond to the components of the HVAC system 146, the above mentioned only as illustrated examples.

In some implementations, in response to the control unit server 104 or the security system 160 generating a classification label corresponding to an output from a respective trained model 170, the classification label can be provided to the central station 162. The central station 162 can monitor many properties by a particular area and even communicate with HVAC dealers 166 to dispatch an HVAC technician to fix the potential issue with the HVAC system 146. The central station 162 can receive the classification of the issue from the security system 160 corresponding to the monitored property 102 and take action to correct the issue. For example, the central station 162 can process the received classification of the issue to determine that fan 144 is broken. In response to determining that the fan 144 corresponding to the HVAC system 146 of the monitored property 102 is broken, the central station 162 can immediately take action to reach out to the owner 130 of the monitored property 102 to verify that they are safe and to determine if emergency HVAC services are needed. In particular, a user located at the central station 162 can call the client device 132 of the owner 130 to let the owner 130 know that an issue was detected with the owner 130's HVAC system 146.

Alternatively, a computer can automatically call the client device 132 and provide an automated voice recording to the owner 130 indicating that an issue was detected with the owner 130's HVAC system 146.

During the call, the central station 162 can ask the owner 130 if an HVAC technician should be dispatched to the monitored property 102 to check out the issue with the HVAC system 146. The owner 130 can respond to the central station 162's question by speaking or entering a key on the keypad through his/her client device 132. If the owner 130 responds "No," then the central station 162 can store the record of contacting the owner 130 regarding the detected issue with the HVAC system 146 in memory and disconnect the call. Alternatively, if the owner 130 responds "Yes," then the central station 162 can indicate to the owner 130 that an HVAC technician will be coming to the monitored property 102 soon and disconnect the call. In response, the central station 162 can communicate with HVAC dealers 166 to dispatch an HVAC technician to the address of the monitored property 102. The central station 162 can send directions to the address of the monitored property 102 to the HVAC technician's client device. For example, as illustrated in system 100, the central station 162 can instruct the HVAC dealers 166 to dispatch HVAC technician 134 to the monitored property 102. The central station 162 can transmit directions of the address of the monitored property 102 to the client device 136 of the HVAC technician 134.

For example, during stage (A), the owner 130 sets the parameters for the "arming home" signature profile that includes setting the configuration for the control unit server 104 to monitor the HVAC system 146. In some implementations, the control unit server 104, the corresponding sensors, and the home devices monitor the HVAC system 146 regardless of the signature profile set at the monitored property 102. In particular, the control unit server 104 can retrieve data at a particular interval throughout the day from the HVAC system 146, the speakers 108, the microphones, the cameras 110, the lights 112, the sensors 114, the thermostat 120, and the home devices 116. The control unit server 104 can poll each of these devices in the monitored property 102 every hour, 24 hours, or once a week, to name a few examples. The owner 130 can set the period with which the control unit server 104 polls these devices. In response to receiving the data from each of these devices, the control unit server 104 can transmit the data 168 from each of these devices to the security system 160. The data 168 can include raw sensor data, thermostat data, and identification data corresponding to the monitored property 102. The control unit server 104 transmits the data 168 over the network 158 to the security system 160.

During stage (B), the security system 160 receives the data 168 from the control unit server 104. The security system 160 provides the data 168 to the trained model 170 to identify a failure corresponding to the HVAC system 146. The failure data can include an indication that the HVAC system 146 has failed, such as a likelihood that a particular component of the HVAC system 146 has broken, or an indication that a particular component of the HVAC system 146 is inefficient and needs to be replaced. The failure data can be found at a hidden layer of the trained model 170 or an output layer of the trained model 170, or a combination of both. The data 168 can be provided sequentially or in parallel to the trained model 170 to produce an indication of a failure output.

During stage (C), the trained model 170 can output an indication 172 corresponding to the HVAC system 146 in response to receiving the data 168 as input. The indication 172 can indicate failure data or non-failure data corresponding to the HVAC system 146. In some implementations, the indication 172 can correspond to a particular likelihood that the HVAC system 146 has failed or a likelihood that a particular component of the HVAC system 146 has failed. For example, the trained model 170 can output an indication 172 of a percentage that the fan 144 has broken, such as 60%. The security system 160 can compare this output percentage to a threshold, such as 50%. If the security system 160 determines the output percentage is greater than a threshold, then the security system 160 can flag that the HVAC system 146 has an issue. Alternatively, the security system 160 discards the output percentage and the corresponding sensor data 168.

During stage (D), the security system 160 generates a classification 174 of the output generated by the trained model 170. In particular, the classification 174 of the output can include a particular label or depiction that describes the output. Additionally, the control unit server 104 can perform the classification of its trained model 170's output. For example, the classification 174 of the output can be a code, such as FRNACE or BLOWR, a textual description, such as "Broken Furnace" or "Old air filter." Additionally, the classification 174 can be a category, such as "Broken" or "Inefficient," or a number that represents a type of error, such as "002" that represents a broken thermometer. The security system 160 can generate multiple classifications for a particular output that includes a code, a textual description, and a number, for example. Other example combinations are possible.

During stage (E), the security system 160 transmits the generated classification 174 that describes the output from the trained model 170 to the central station 162. The security system 160 transmits the generated classification 174 to the central station 162 over the network 158. Additionally, the security system 160 can transmit the generated classification 174, the indication 172, and the corresponding input sensor data 168 to store in the HVAC database 164 for later retrieval. The security system 160 can later retrieve this data from the HVAC database 164 for re-training and fine-tuning the trained model 170 located at the security system 160 and at the control unit server 104.

During stage (F), the central station 162 can receive the classification label 174 corresponding to the indication 172 from the trained model 170. In response, the central station 162 can take corrective action to fix the issue denoted by the classification label 174. For example, the central station 162 can determine from the classification label 174 that the supply air ducts 156A and 156B are blocked and not able to provide warm air to the monitored property 102. In response, the central station 162 can contact the owner 130 of the monitored property 102 to verify the owner 130 and corresponding members of the monitored property 102 are safe. For example, a user at the central station 162 can call the client device 132 of the owner 130 to verify that the owner 130 is safe from harm. Alternatively, a voice recording can call the client device 132 and provide a recorded message to the owner 130. The central station 162 can also ask the owner 130 whether an issue exists with one or more components of his/her HVAC system 146 or with the HVAC system 146 itself. For example, the user at the central station 162 can speak to the owner 130 and speak the phrase "Does an issue exist with your HVAC fan?" The central station 162 can additionally ask to the owner 130 whether an HVAC technician should be dispatched to the monitored property 102 to fix the issue with the HVAC system 146.

During stage (G), the owner 130 can interact with his/her client device 132 to provide a response 178 to the central station 162. For example, the owner 130 can speak to the client device 132 or interact with the keys of the client device 132 to provide the response. The owner 130 may open an application on the client device 132, such as a smart home application, to be able to communicate with the user or the voice recording from the central station 162. In some implementations, the owner 130 can decline the notification 176 provided by the central station 162. In other implementations, the owner 130 can respond to the notification 176 by indicating "Yes" 178 through the client device 132 so the central station 162 can take further action to correct the issue produced by the train model 170.

During stage (H), the central station 162 can receive the response 178 from the owner 130 and proceed with communicating with the HVAC dealers 166. In particular, the response 178 can indicate if the owner 130 is safe, whether the owner 130 notices an issue with his/her HVAC system 146, and whether the owner 130 wishes an HVAC technician, such as HVAC technician 134, be dispatched to the monitored property 102. If the central station 162 receives an indication that the owner 130 does not notice an issue with his/her HVAC system 146, the central station 162 can proceed to contact the HVAC dealers 166 to dispatch an HVAC technician 134 to the monitored property 102. If the owner 130 does not wish to have an HVAC technician 134 dispatched to his/her monitored property 102, the central station 162 can discard the response 178 from the owner 130 and store the raw sensor data, the indication 172, the classification label 174 of the indication, and data identifying the monitored property 102 in the HVAC database 164 for later retrieval. This data can be used to retrain the trained model 170. If the owner 130 does wish to have an HVAC technician 134 dispatched to check his/her HVAC system 146 at the corresponding monitored property 102, then the central station 162 can call the HVAC dealers 166 to dispatch an HVAC technician 134 to the monitored property 102. The central station 162 can provide detailed directions to the client device 136 of the owner 134 as well data identifying the issue corresponding to the HVAC system 146 that requires service. For example, the data identifying the issue can include the indication 172, a classification 174 of the issue, and any descriptions of issues provided by the owner 130 when a user at the central station 162 spoke with the owner 130 asking if the owner 130 recognized any issue with his/her HVAC system 146.

In one use case of how this works in a real-world environment, a homeowner, such as Willow, is at her monitored property 102 on a hot Saturday in the summer when her air-conditioning stops working. Willow does not notice that her AC stops working since her monitored property 102's temperature is still comfortable. The control unit server 104 and the security system 160, in tandem or alone, detects an HVAC system failure and transmits the event to the central station 162 monitoring Willow's monitored property 102. The central station 162 determines that the failure is sever enough to contact Willow by initiating a 2-way audio call to discuss the issue with Willow's HVAC system. Willow is not convinced that the AC is broken, but she notices that the temperature inside is 76 F. and her set point is 73 F. Willow verifies that no cold air is blowing out of the vents and she confirms with the central station that she would like to have a technician dispatched who can resolve the problem. The central station can relay this information back to the security system 160 or to the HVAC dealers 166, who matches her with Jim's AC and Heating Corporation, a local HVAC dealer. Jim's AC and Heating Corporation is provided with Willow's address and contact information with Willow's approval, and an HVAC technician from Jim's AC and Heating Corporation is dispatched to her property 102 to fix the problem before the monitored property 102 reaches an unsafe temperature.

By providing notifications and actions to/from the central station, the central station can automatically contact homeowners to make them feel safe and comfortable. This streamlines the process of scheduling HVAC appointments with homeowners and helps get customers immediate assistance in severe HVAC scenarios. HVAC dealers 166 can benefit of the use of the central station by receiving more business, and this technology provides a new level of service that security dealers can offer various customers at monitored properties. Overall, this new feature provides tangible values to HVAC dealers and homeowners, in improving the overall HVAC analytics system.

Figure 1B:
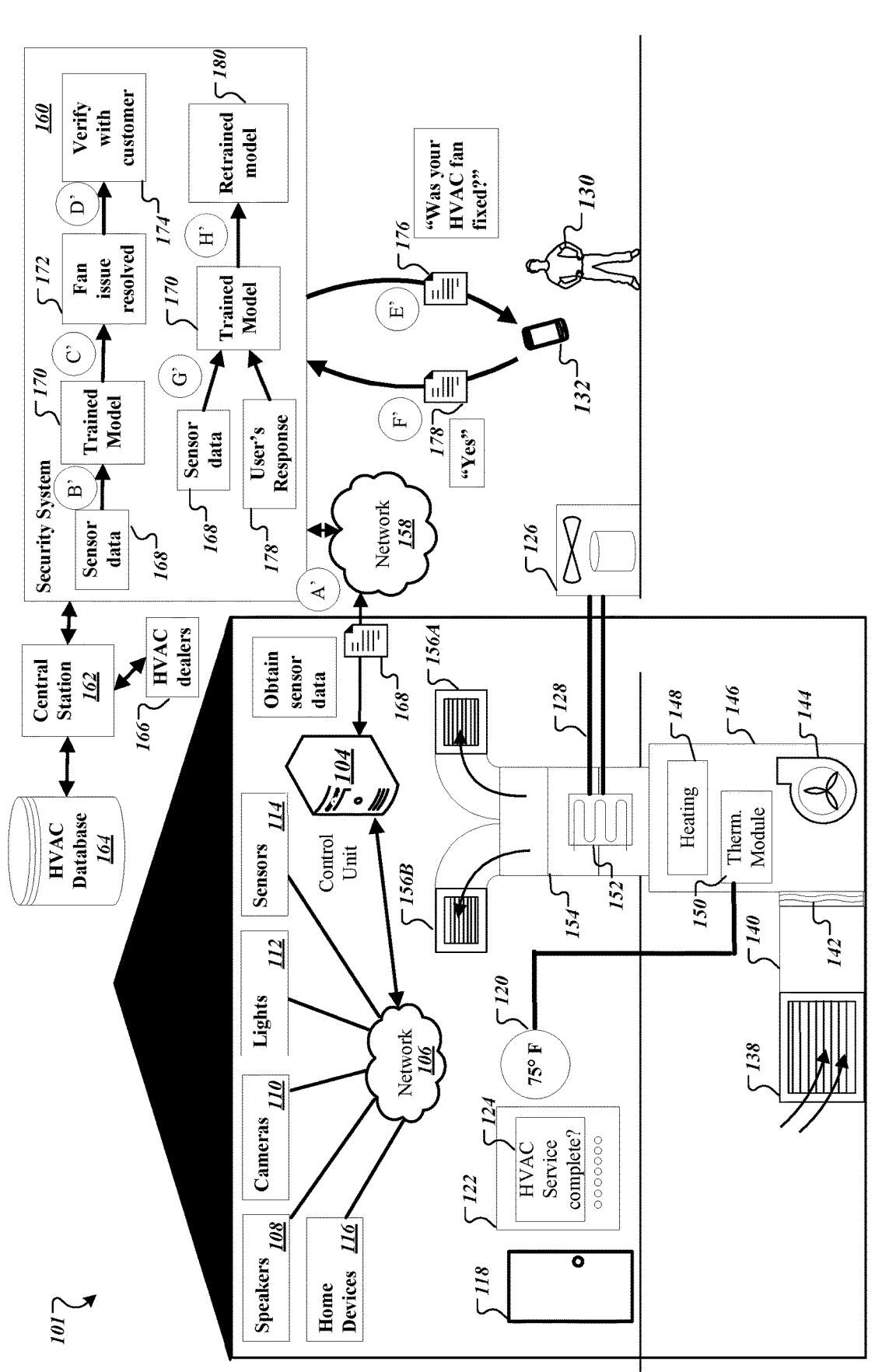
FIG. 1B is another contextual diagram of an example system for monitoring HVAC services in a monitored property.

FIG. 1B is another contextual diagram of an example system 101 for monitoring HVAC services in a monitored property. System 101 includes similar components and performs similar functions to system 100. The similar components between system 100 and system 101 will not be described again. In some implementations, the system 101 uses a machine-learning algorithm to detect and identify HVAC systems corresponding to monitored properties, such as monitored property 102, that has transitioned from an issue status to a healthy status. As system 100 relates to detecting an issue with a HVAC system 146, verifying with the homeowner whether the individuals of the monitored property 102 were safe, and whether to dispatch an HVAC technician to fix the potential issue with the HVAC system 146, system 101 relates to verifying a state change of the HVAC system 146 that indicates when the HVAC system 146 transitions from an issue state back to property performance.

In some cases, this transition can indicate that an HVAC technician serviced the HVAC system 146. However, not every state transition of this type will correspond to a servicing. For example, changes in weather patterns, routine maintenance performed by the end user, other external factors may cause the machine-learning model to clear an issue alert corresponding to the HVAC system 146. In order to ensure that the machine-learning model produces correct results regarding the service state change of the HVAC system 146, the security system 160 can isolate the issues resolved by confirming whether someone, such as an HVAC technician, was in the monitored property 102 in the window of time whether the HVAC system 146's behavior changed. If no one entered the home during that window of time, the security system 160 can then infer that no repair on the HVAC system 146 was completed. In addition, the control unit server 104 and the security system 160 can work in tandem to determine, using video and imagery analytics, that activity in the monitored property 102 was not standard behavior, and in fact, indicative of a service call to an HVAC technician. The control unit server 104 can also cross-reference motion sensor data and other sensor data in the monitored property 102 to confirm that certain parts of the monitored property 102, such as doors or areas within proximity to the HVAC system 146, were accessed in the expected service time window.

In some implementations, whether or not the sensor data is available at the monitored property 102, one reliable way to verify whether the HVAC system 146 was service includes prompting the owner of the monitored property 102 to provide a confirmation of service with a notification. This notification provided by the owner, such as owner 130, would allow the owner 130 to confirm or deny of such service to the HVAC system 146, and this feedback would be provided to the security system 160. In particular, the feedback from the owner 130, along with the raw sensor data and the previous output of the trained model 170 indicating a state change in the service of the HVAC system 146 (albeit, a false detection) can be used to further train the existing trained model 170 or another machine-learning model that is specifically relied upon for detecting data that indicates a state change (e.g., issue status changed to healthy status). Additionally, this data can be stored in the HVAC database 164 that gives the security system 160 a good indication of service history, which can help the security system 160 and the central station 162 provide useful information to the user in the future. For example, as the security system 160 is monitoring a property 102, if the security system 160 determines that an HVAC system 146 corresponding to the monitored property 102 has gone several users with HVAC service from an HVAC technician or another user, it is beneficial for the security system 160 to send reminders for maintenance or service, such as seasonal maintenance reminders or in app reminders with upsell offers for maintenance plans. Additionally, the security system 160 can use this information from the HVAC database 164 to avoid sending redundant maintenance request reminders or advertising special offers in the application on the owner's client device 132.

For example, during stage (A'), similar to stage (A) from system 100, the control unit server 104, the corresponding sensors, and the home devices monitor the HVAC system 146 at the monitored property 102. In particular, the control unit server 104 can retrieve data at a particular interval from the HVAC system 146, the speakers 108, the microphones, the cameras 110, the lights 112, the sensors 114, the thermostat 120, and the home devices 116. In response to receiving this data 168 at the control unit server 104, the control unit server 104 can transmit the data 168 to the security system 160 over the network 158. The data 168 can include raw sensor data, thermostat data, and identification data corresponding to the monitored property 102. The control unit server 104 may not have an idea what data 168 represents until the data 168 is provided to the trained model 170 located at the security system 160. In some implementations, the trained model 170 can be located at the control unit server 104, where data 168 is provided to generate a representation of a potential state change of the HVAC system 146.

During stage (B'), similar to stage (B) from system 100, the security system 160 receives the data 168 from the control unit server 104. The security system 160 can store this data 168 in the HVAC database 164 for future retrieval. Additionally, the security system 160 can provide the data 168 to the trained model 170 to identify whether a state change occurred from an unhealthy HVAC system 146 to a healthy HVAC system 146. The trained model 170 in system 101 can be similar or different from the trained model 170 in system 100. The state change output from the trained model 170 can indicate whether a service was performed on an HVAC system 146 by an HVAC technician or whether another user performed a service on the HVAC system 146. The state change data output by the trained model 170 can be a likelihood, such as a percentage, that this change occurred. The state change data can be found at a hidden layer of the trained model 170 or at an output layer of the trained model 170, or a combination of both. The data 168 can be provided to the trained model 170 sequentially or in parallel to the nodes of the trained model 170 to produce the indication.

During stage (C'), the trained model 170 can output an indication 172 that indicates the HVAC system 146 has transitioned from an issue state to a healthy state. The indication 172 cannot only indicate this transition, but can also indicate what component of the HVAC system 146 has been transitioned to properly work. For example, as in system 100, if the trained model 170 identifies that the fan 144 is broken, then in system 101, the trained model 170 can output an indication that the fan 144 has been fixed. The trained model 170 bases its output on the data provided by the sensors in the monitored property 102. For example, this data can show that user instructed the temperature of the monitored property 102 to change from 67 degrees F. to 70 degrees F. and the HVAC system 146 did warm the monitored property 102 to 70 F. in a reasonable time. Alternatively, the trained model 170 can output a likelihood, such as a percentage, that the HVAC system 146 has transitioned to a health state from an issue state. For example, the trained model 170 can output a likelihood of 65% that the HVAC system 146 has transition. The security system 160 can compare this output percentage to a threshold percentage, such as 50%. If the security system 160 determines that the output percentage is greater than the threshold, then the security system 160 can flag that the HVAC system 146 has transitioned from the issue state to the healthy state. Alternatively, if the trained model 170 outputs an indication that is less than the threshold percentage, the security system 160 can reach out to the owner 130 and possibly, the HVAC technician to verify if a service was performed. The security system 160 can also verify with the owner 130 if the output percentage is greater than the threshold percentage, to ensure the trained model 170 is performing as expected.

During stage (D'), the security system 160 can verify with the owner 130 and the HVAC technician to determine if a service was properly performed. In particular, the security system 160 performs this verification to check the quality of the service performed. Thus, if the output of the trained model 170 indicates that the service was performed but the percentage was only 51%, the security system 160 can verify with both users to determine if a service was performed. The security system 160 can look up contact information corresponding to the user, such as an email address, a cellular telephone number, and a monitored property 102 telephone number. Using this contact information, the security system 160 can contact the owner 130.

During stage (E'), the security system 160 can transmit a notification 176 to the client device 132 of the owner 130. For example, the security system 160 can transmit a push notification to the client device 132 that recites, "Was your HVAC fan fixed?" Alternatively, the security system 160 can email the client device 132, can transmit a text to the client device 132, or can call the client device 132 with an automated voice recording of "Was your HVAC fan fixed?" In other implementations, a user located at the security system 160 can call the owner 130 at the client device 132 and speak with the owner 130 asking if the HVAC fan has been fixed.

During stage (F'), the owner 130 can interact with his/her client device 132 to provide a response 178 to the security system 160. For example, the owner 130 can also speak to the client device 132 or interact with keys of the client device 132 to provide the response. The owner 130 may open an application on the client device 132, such as a smart home application, to be able to communicate and respond to the security system 160. In some implementations, the owner 130 can respond to the message with a "No" transmitted by the security system 160. Alternatively, the owner 130 can respond to the message with a "Yes." The response 178 can be provided back to the security system 160 over the network 158.

During stage (G'), the security system 160 can receive the response 178 and determine the intent of the response 178. For example, if the response 178 indicates that "Yes," the HVAC fan was fixed, the security system 160 can proceed with refining the trained model 170 with a proper output that has been verified by the owner 130. Additionally, the security system 160 can store the response 178, the corresponding data 168 that includes the raw sensor data from the monitored property 102, and the indication 172 from the output of the trained model 170 in the HVAC database 164 for future retrieval at a later point in time. This data can be used to retrain the trained model 170 or to train a subsequent new model. Alternatively, if the user indicates "No," then the security system 160 infers from this that no HVAC service was performed on the HVAC system 146 and the trained model 170 produced an incorrect output. The security system 160 can take further steps to ensure the trained model 170 reduces the number of subsequent erred outputs. For example, the percentage threshold of the security system 160 should be moved to 60% instead of 50%. In another example, the security system 160 can retrain the trained model 170. For example, the security system 160 can provide the sensor data 168, the user's response 178, and the indication 172 from the output of the trained model 170 to the input of trained model 170 for retraining purposes.

During stage (H'), the security system 160 can iteratively train the trained model 170 with data until the trained model 170 produces the correct output. For example, the security system 160 can iteratively provide the sensor data 168, the user's response 178, and the indication 172 of the output from the trained model 170 to the trained model 170, while changing the parameters of the trained model 170 each iteration, until the output of the trained model matches the user's response 178. In particular, if the indication 172 of the output from the trained model 170 indicates that the HVAC system 146 had a state change from issue status to healthy status, and the owner 130 verified that no service was performed on the HVAC system 146, then the security system 160 can iteratively update the parameters of the trained model 170 until the output is below the threshold with the same input. Once the trained model 170 meets the desired expectation, the security system 160 can transmit the newly retrained model 180 to its memory and transmit the retrained model 180 to the control unit server 104.

In some implementations, the security system 160 may obtain thermostat information from the monitored property 102 to determine whether the HVAC system 146 has been fixed. In particular, once the HVAC technician 134 or another HVAC technician has performed a fix on the HVAC system 146 as indicated by the detected failure event, the control unit server 104 may obtain thermostat information from the thermostat 120 to determine whether the HVAC system 146 has been fixed. For example, the HVAC model 170 may indicate no detected failure or inefficient component in the HVAC system 146 after receiving thermostat information from thermostat 120 over a particular period of time, such as a day, once the HVAC technician 134 fixes the HVAC system 146. By providing a no detected failure or inefficient component over a particular period of time, the HVAC model 170 becomes more robust to external factors such as end-user behavior or changing outdoor weather patterns that likely have little bearing on the HVAC system 146's performance, but could generate deceiving model results for short periods of time. The HVAC technician 134 may shut off the HVAC system 146 during maintenance and turn the HVAC system 146 back on after completion, at which the HVAC model 170 may start to receive thermostat information. While the HVAC system 146 is shut off, the HVAC model 170 may not receive any thermostat information.

The security system 160 can use thermostat information from the monitored property 102, data from the HVAC system 146, and additional information to validate the productivity of a service call for an HVAC technician. For example, the control unit server 104 may retain thermostat information from the thermostat 120, data from sensors monitoring the HVAC system 146 at the monitored property 102, and additional information, such as recorded times of HVAC technician visits to the monitored property 102. The control unit system 104 can then use this information to assess the HVAC system 146 before the service and after the service, to determine how effective the service was. Determining how effective the service was is valuable to the owner 130 and the HVAC dealers 166, as this information can potentially be used as a metric to rate the performance of an HVAC technician 134. The security system 160 can provide the thermostat information, the data from the HVAC system 146, and data indicating whether a service was performed on the HVAC system 146 to the machine-learning model 170. The machine-learning model 170 may produce an indication of whether failure exists with the HVAC system 146. The indication can be a percentage of a likelihood of a failure or a percentage of failed component at the HVAC system 146. In one example, if the trained model 170 produces an indication of 0% failure after service performed, then the security system 160 can note that the HVAC technician 134 was 100% effective in fixing the issue with the HVAC system 146. In another example, if the trained model 170 produces an indication of 50% failure after service performed, then the security system 160 can note that the HVAC technician 134 was 50% effective in fixing the issue with the HVAC system 146. The security system 160 can provide its rating of HVAC technicians to the HVAC dealers 166 for performance evaluation.

In some implementations, the security system 160 may test whether the HVAC system 146 is properly working when owner 130 is away from the monitored property 102. In particular, when the armed home signature profile is set, this indicates to the control unit server 104 that the owner 130 is away from the monitored property 102. Additionally, the security system 160 may instruct the control unit server 104 to run specific tests to test whether the HVAC system is properly working. For example, the control unit server 104 may be instructed to increase the temperature of the monitored property to 85 degrees Fahrenheit and then down to 45 degrees Fahrenheit. The control unit server 104 may determine an amount of time it took for the HVAC system 146 to raise and lower the temperature of the HVAC system 146 to see if it falls within a reasonable threshold. If the test falls outside a threshold, such as the period took an entire day, then the security system 160 may notify owner 130 that the HVAC system 146 is not working properly. Additionally, the security system 160 may perform tests, such as shutting the HVAC system 146 off and on, measuring a difference between the desired temperature set by the thermostat and the actual temperature in the monitored property 102. If the difference between the desired the desired temperature set by the thermostat and the actual temperature in the monitored property 102 falls within a threshold, such as 1 degree Fahrenheit, then the HVAC system 146 is functioning as desired. In the event that the HVAC system 146 is functioning as desired, the security system 160 may notify owner 130 that the HVAC system 146 is functioning properly. The security system 160 may communicate with the owner 130 through the client device 132 or by sending a message through the alarm panel 122 to display via message display 123 upon return of the owner 130.

In one use case of how this works in a real-world environment, a homeowner, such as Michael, has a smart thermostat in his monitored property 102 that was installed on a 10-year-old furnace and air conditioning system. Michael does not get seasonal maintenance on his monitored property 102 so his air conditioner stopped working the following summer while he was on vacation. He received an alert notification making him aware of the system issue, and he scheduled a service call to resolve the issue. The day before Michael arrived home, a technician was able to repair the system. Shortly afterwards, the security system 160 was able to detect that the furnace and air conditioning system was now working properly and notified Michael that the system was restored to normal working order. In that notification, the system requested confirmation of service. Michael confirmed that his AC was repaired and was able to confirm that the refrigerant levels were low, so the technician recharged the system. Now, the security system 160 understands that the change in behavior was due to a service call and not changing weather patterns or user behavioral changes. The security system 160 also reset the timer on Michael's filter change reminder, as any service on an air conditioner would also come with a changed filter for the HVAC system 146. Now, Michael will not be inundated with a redundant filter change reminder right after a service was completed.

By detecting of HVAC service performed on an HVAC system, service dealers can be held accountable for the quality of their HVAC service, assuring that homeowners are receiving the highest quality care, in addition to providing an intelligent service to homeowners. In addition, this detection provides tangible values to dealers and customers, and benefits the security system by allowing for a more targeted HVAC technique for training new machine-learning models to detect specific issues due to a supply of ground truth data.

FIG. 2 is a flowchart of an example process 200 for determining an HVAC system issue at the monitored property and alerting a customer of the HVAC system issue. Generally, the process 200 includes obtaining thermostat information and sensor data from a monitored property; determining an HVAC condition of an HVAC at the monitored property based on an analysis of the obtained thermostat information and the sensor data from the monitored property using a trained model; generating data that represents the HVAC condition based on predetermined conditions of the HVAC in the monitored property; and, providing the data that represents the HVAC condition to a central station, where the central station can communicate with a customer of the monitored property to verify the HVAC condition with the customer and address the HVAC condition.

During 202, the security system 160 obtains thermostat information and sensor data from a monitored property 102. In some implementations, the control unit server 104 can retrieve data at a particular interval throughout the day from the HVAC system 146, the speakers 108, the microphones, the cameras 110, the lights 112, the sensors 114, the thermostat 120, and the home devices 116. The control unit server 104 can poll each of these devices in the monitored property 102 every hour, 24 hours, or once a week, to name a few examples. In response to receiving the data from each of these devices, the control unit server 104 can transmit the data 168 from each of these devices to the security system 160. The data 168 can include raw sensor data, thermostat data, and identification data corresponding to the monitored property 102. The control unit server 104 transmits the data 168 over the network 158 to the security system 160.

During 204, the security system 160 determines an HVAC condition of an HVAC at the monitored property based on an analysis of the obtained thermostat information and the sensor data from the monitored property using a trained model. The HVAC condition can indicate whether an issue exists or does not exist with the HVAC system. The security system 160 receives the data 168 from the control unit server 104 and provides the data 168 to the trained model 170 to identify the HVAC condition corresponding to the HVAC system 146. The HVAC condition can include an indication HVAC system 146 has failed, such as a likelihood that a particular component of the HVAC system 146 has broken, or an indication that a particular component of the HVAC system 146 is inefficient and needs to be replaced. The HVAC condition can be found at a hidden layer of the trained model 170 or an output layer of the trained model 170, or a combination of both. In some implementations, the indication 172 of the output from the trained model 170 can indicate failure or non-failure corresponding to the HVAC system. For example, the trained model 170 can output an indication 172 of a percentage that the thermostat module 150 is broken, such as 80%. The security system 160 can compare this output percentage to a threshold. If the security system 160 determines that the output percentage is greater than the threshold, then the security system 160 can flag that the HVAC system 146 has an issue. Alternatively, the security system 160 discards the output percentage and the corresponding sensor data 168.

During 206, the security system 160 generates data that represents the HVAC condition based on predetermined conditions of the HVAC in the monitored property. For example, the security system 160 generates a classification label, such as classification 174, corresponding to the output generated by the trained model 170. The classification 174 can include a particular label or depiction that describes the output. The classification 174 can be based on previous classifications and corresponding outputs stored in the HVAC database 164. For example, the classification 174 of the output can be a code, such as FILTER or BLOWR, a textual description, such as "Broken Furnace" or "Old air filter." Additionally, the classification 174 can be a category, such as "Broken" or "Inefficient," or a number that represents a type of error, such as "002" that represents a broken thermometer. This data can be stored in the HVAC database 164 for future usage by the security system 160 and the control unit server 104.

During 208, the security system 160 provides the data that represents the HVAC condition to a central station, whether the central station can communicate with a customer of the monitored property to verify the HVAC condition with the customer and address the HVAC condition. In particular, the security system 160 can transmit the generated classification 174 that describes the output of the trained model 170 to the central station 162. The central station 162, upon receiving the generated classification 174 can take corrective action to address the HVAC condition. For example, the central station 162 can determine from the classification label 174 that the supply air ducts 156A and 156B are blocked and not able to provide warm air to the monitored property 102. In another example, the central station 162 can determine from the classification label 174 that the fan 144 has died. The central station 162 can then contact the owner 130 to verify and address the HVAC condition. The central station 162 transmit a notification to the owner 130's client device 132 or a user can call the owner 130 to verify whether the owner is safe and whether an issue exists with the HVAC system 146. The owner 130 can respond to the response transmitted by the central station 162, by indicating whether an issue does or does not exist with the HVAC system 146.

In response, the central station 162 can receive the response from the owner 130 and proceed to communicate with the HVAC dealers 166. In particular, the response 178 can indicate if the owner 130 is safe, whether the owner 130 notices an issue with his/her HVAC system 146, and whether the owner 130 wishes an HVAC technician, such as HVAC technician 134, be dispatched to the monitored property 102. The central station 162 can communicate with the HVAC dealers 166 to dispatch an HVAC technician to the monitored property 102 if requested for by the owner 130. If the owner 130 does not wish to have an HVAC technician dispatched to his/her monitored property 102 because no issue exists with the HVAC system 146, the central station 162 can discard the response 178 from the owner 130 and store the raw sensor data, the indication 172, the classification label 174 of the indication, and data identifying the monitored property 102 in the HVAC database 164 for later retrieval. Alternatively, if the owner 130 does not wish to have an HVAC technician dispatched to his/her monitored property 102 because the owner 130 plans to fix the issue with the HVAC system 146, the central station 162 can further store the central station 162 can discard the response 178 from the owner 130 and store the raw sensor data, the indication 172, the classification label 174 of the indication, data identifying the monitored property 102, and an indication that the trained model 170 was correct in the HVAC database 164.

FIG. 3 is a flowchart of an example process 300 for generating a model from a machine-learning algorithm that can detect issues of an HVAC system. Generally, the process 300 includes obtaining thermostat information and data from sensors of a monitored property; determining HVAC service was completed based on analysis of the thermostat information and the data from sensors of the monitored property using a trained model; transmitting a request to a customer of the monitored property to verify whether the HVAC service was completed; receiving a response to the request from the user indicating that the HVAC service was completed at the monitored property; providing the response, the thermostat information, and the data from sensors of the monitored property to the trained model to update the trained model to detect subsequent HVAC service completions.

During 302, the security system 160 obtains thermostat information and sensor data from a monitored property 102. 302 is similar to 202. In some implementations, the control unit server 104 can retrieve data at a particular interval throughout the day from the HVAC system 146, the speakers 108, the microphones, the cameras 110, the lights 112, the sensors 114, the thermostat 120, and the home devices 116. The control unit server 104 can poll each of these devices in the monitored property 102 every hour, 24 hours, or once a week, to name a few examples. In response to receiving the data from each of these devices, the control unit server 104 can transmit the data 168 from each of these devices to the security system 160. The data 168 can include raw sensor data, thermostat data, and identification data corresponding to the monitored property 102. The control unit server 104 transmits the data 168 over the network 158 to the security system 160.

During 304, the security system 160 determines HVAC service was completed based on analysis of the thermostat information and the data from sensors of the monitored property using a trained model. In particular, the security system 160 receives the data 168 from the control unit server 104 and provides the data 16 to the trained model 170 to identify whether a state change occurred of an unhealthy HVAC system 146 to a healthy HVAC system 146. The state change output from the trained model 170 can indicate whether a service was performed on an HVAC system 146 by an HVAC technician or whether another user performed a service on the HVAC system 146. The state change data output by the trained model 170 can be a likelihood, such as a percentage, that this change occurred. The state change data can be found at a hidden layer of the trained model 170 or at an output layer of the trained model 170, or a combination of both. The data 168 can be provided to the trained model 170 sequentially or in parallel to the nodes of the trained model 170 to produce the indication.

The trained model 170 can produce an indication 172 that indicates the HVAC system 146 has transitioned from an issue state to a healthy state. The indication 172 cannot only indicate of this transition, but can also indicate what component of the HVAC system 146 has been transitioned to properly work. The trained model 170 bases its output on the data provided by the sensors in the monitored property 102. For example, this data can show that user instructed the temperature of the monitored property 102 to change from 67 degrees F. to 70 degrees F. and the HVAC system 146 did warm the monitored property 102 to 70 F. in a reasonable time. Alternatively, the trained model 170 can output a likelihood, such as a percentage, that the HVAC system 146 has transitioned to a health state from an issue state. The security system 160 can compare this output percentage to a threshold percentage, such as 70%. The higher the percentage, the more accurate the trained model 170 has to be in detecting a change in state with the HVAC system 146. If the security system 160 determines that the output percentage is greater than the threshold, then the security system 160 can flag that the HVAC system 146 has transitioned from the issue state to the healthy state. Alternatively, if the trained model 170 outputs an indication that is less than the threshold percentage, the security system 160 can reach out to the owner 130 and possibly, the HVAC technician to verify if a service was performed.

During 306, the security system 160 transmits a request to a customer of the monitored property to verify whether the HVAC service was completed. The security system 160 can look up contact information corresponding to the user, such as an email address, a cellular telephone number, and a monitored property 102 telephone number. Using this contact information, the security system 160 can contact the owner 130. The notification/request transmitted to the owner 130 of the monitored property 102 can be a push notification, an email, a text, an instant message, or a call to determine whether the HVAC service corresponding to the HVAC system 146 was completed.

During 308, the security system 160 receives a response 178 to the request from the user indicating that the HVAC service was completed at the monitored property 102. In particular, the owner 130 can interact with his/her client device 132 to respond to the security system 160 to indicate either "No," that that owner 130's corresponding HVAC system 146 was not fixed, or "Yes," that the owner 130's corresponding HVAC system 146 was fixed. The response 178 can be provided back to the security system 160 over the network 158 indicating that the HVAC service was completed.

During 310, the security system 160 provides the response, the thermostat information, and the data from sensors of the monitored property to the trained model to update the trained model to detect subsequent HVAC service completions. For example, the security system 160 can retrain the trained model 170 using the sensor data 168, the user's response 178, and the indication 172 of the output of the trained model 170. Once the trained model 170 produces an output that is in line with the user's response 178, the security system 160 can stop training the model 170.

FIG. 4 is a flowchart of an example process 400 for performing one or more thermostat tests to determine whether the HVAC system 146 is working properly when the household is empty. Generally, the process 400 includes receiving an indication from a customer that an HVAC technician is scheduled to perform service on an HVAC at a monitored property to fix an issue with the HVAC; obtaining thermostat information and data from sensors of the monitored property after a scheduled service time of the HVAC has elapsed; determining the HVAC issue still exists based on an analysis of the thermostat information and the data from sensors of the monitored property using a trained model; and providing a notification to the customer of the monitored property indicating that the HVAC technician did not fix the issue with the HVAC.

During 402, the security system 160 receives an indication from a customer that an HVAC technician is scheduled to perform service on an HVAC at a monitored property to fix an issue with the HVAC. In some implementations, the owner 130 may indicate through his/her client device 132 that an HVAC technician is scheduled to perform service, such as fix the fan 144, on the HVAC system 146. The owner 130 can store this indication in his calendar on the client device 132, which can be monitored by the smart home application. Alternatively, the owner 130 can indicate that an HVAC technician is coming to the monitored property 102 at a particular time in response to the security system 160 identifying an issue with the HVAC system 146. The owner 130 can also call, text, or email the central station 162 or the security system 160 indicating a time and for what reason the HVAC technician is coming to fix the HVAC system 146.

During 404, the security system 160 obtains thermostat information and data from sensors of the monitored property after a scheduled service time of the HVAC has elapsed. After a particular time period has elapsed surrounding the time in which the HVAC technician was scheduled to fix the HVAC system 146, the control unit server 104 can obtain thermostat and sensor data that monitors the HVAC system 146 to determine whether the HVAC system 146 was in fact fixed. In particular, the control unit server 104 can retrieve data at a scheduled time following the HVAC technician's appointment time. This can be 10 hours or a full day after the HVAC technician's appointment time. After that time has elapsed, the control unit server 104 can retrieve data from the HVAC system 146, the speakers 108, the microphones, the cameras 110, the lights 112, the sensors 114, the thermostat 120, and the home devices 116. In response to receiving the data from each of these devices, the control unit server 104 can transmit the data 168 from each of these devices to the security system 160. The data 168 can include raw sensor data, thermostat data, and identification data corresponding to the monitored property 102. The control unit server 104 transmits the data 168 over the network 158 to the security system 160.

During 406, the security system 160 determines the HVAC issue still exists based on an analysis of the thermostat information and the data from sensors of the monitored property using a trained model. The security system 160 receives the data 168 from the control unit server 104 and provides the data 168 to the trained model 170 to determine whether the HVAC condition corresponding to the HVAC system 146 still exists. The output of the trained model 170 can be a percentage that is compared to a threshold. If the security system 160 determines that the output percentage is greater than the threshold, then the security system 160 can flag that the issue associated with HVAC system 146 still exists. Alternatively, the security system 160 can flag that the issue associated with HVAC system 146 no longer exists.

During 408, the security system 160 provides a notification to the customer of the monitored property indicating that the HVAC technician did not fix the issue with the HVAC. The security system 160 can transmit a notification to the owner 130 of the monitored property 102 indicating whether the issue associated with the HVAC system 146 still exists or no longer exists. The notification can be a push notification, an email, a text, or can call the client device 132 of the owner 130 indicating of the status of the issue corresponding to the HVAC system 146.

Figure 5:
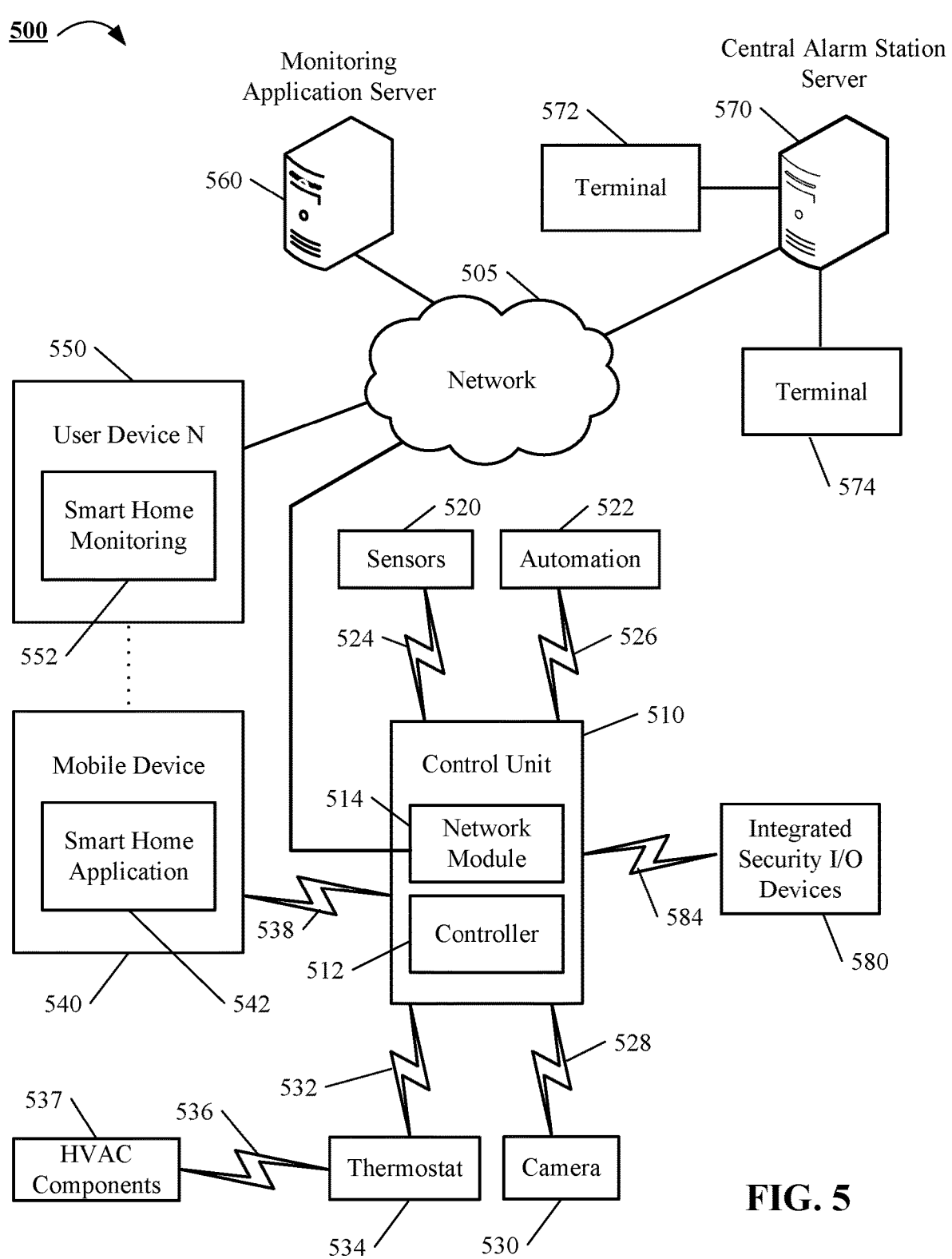
FIG. 5 is a block diagram of an example of a home monitoring system that may utilize various components to monitor an HVAC.

FIG. 5 is a block diagram of an example of a home monitoring system 500 that may utilize various components to monitor an HVAC system 146. The home monitoring system 500 includes a network 505, a control unit server 510, one or more user devices 540 and 550, a monitoring application server 560, and a central alarm station server 570. In some examples, the network 505 facilitates communications between the control unit server 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the control unit server 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit server 510 includes a controller 512 and a network module 514. The controller 512 is configured to control an HVAC system that includes the control unit server 510. In some examples, the controller 512 may include a processor or other control circuitry configured to execute instructions of a program that controls operation of an HVAC system. In these examples, the controller 512 may be configured to receive input from sensors, thermostats, or other devices included in the HVAC system and control operations of devices included in the household (e.g., a shower head, a faucet, a dishwasher, etc.). For example, the controller 512 may be configured to control operation of the network module 514 included in the control unit server 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit server 510 to communicate over a local area network and/or the Internet. The network module 514 also may be a voiceband modem configured to enable the alarm panel to communicate over the telephone lines of Plain Old Telephone Systems (POTS).

The HVAC system that includes the control unit server 510 includes one or more sensors. For example, the monitoring system may include multiple sensors 520. The sensors 520 may include a temperature sensor, a humidity sensor, a leaking sensor, or any other type of sensor included in an HVAC system 146. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit server 510 communicates with the automation module 522 and the camera 530 to perform monitoring. The automation module 522 is connected to one or more devices that enable home automation control. For instance, the automation module 522 may be connected to one or more lighting systems and may be configured to control operation of the one or more lighting systems. Also, the automation module 522 may be connected to one or more electronic locks at the property and may be configured to control operation of the one or more electronic locks (e.g., control Z-Wave locks using wireless communications in the Z-Wave protocol. Further, the automation module 522 may be connected to one or more appliances at the property and may be configured to control operation of the one or more appliances. The automation module 522 may include multiple modules that are each specific to the type of device being controlled in an automated manner. The automation module 522 may control the one or more devices based on commands received from the control unit server 510. For instance, the automation module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a HVAC system monitored by the control unit server 510. The camera 530 may be configured to capture single, static images of the area and also video images of the area in which multiple images of the area are captured at a relatively high frequency (e.g., thirty images per second). The camera 530 may be controlled based on commands received from the control unit server 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit server 510. The camera 530 may employ a small solar cell to recharge the battery when light is available. Alternatively, the camera 530 may be powered by the controller 512's power supply if the camera 530 is co-located with the controller 512.

In some implementations, the camera 530 communicates directly with the monitoring application server 560 over the Internet. In these implementations, image data captured by the camera 530 does not pass through the control unit server 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit server 510 and can control the environmental (e.g., temperature) settings based on commands received from the control unit server 510.

In some implementations, the thermostat 534 is a dynamically programmable thermostat and can be integrated with the control unit server 510. For example, the dynamically programmable thermostat 534 can include the control unit server 510, e.g., as an internal component to the dynamically programmable thermostat 534. In addition, the control unit server 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

The sensors 520, the module 522, the camera 530, the thermostat 534, and the integrated security devices 580 communicate with the controller 512 over communication links 524, 526, 528, 532, and 584. The communication links 524, 526, 528, 532, and 584 may be a wired or wireless data pathway configured to transmit signals from the sensors 520, the module 522, the camera 530, the thermostat 534, and the integrated security devices 580 to the controller 512. The sensors 520, the module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, and 584 may include a local network. The sensors 520, the module 522, the camera 530, the thermostat 534, and the integrated security devices 580 and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The monitoring application server 560 is an electronic device configured to provide monitoring services by exchanging electronic communications with the control unit server 510, the one or more user devices 540 and 550, and the central alarm station server 570 over the network 505. For example, the monitoring application server 560 may be configured to monitor events (e.g., alarm events) generated by the control unit server 510. In this example, the monitoring application server 560 may exchange electronic communications with the network module 514 included in the control unit server 510 to receive information regarding events (e.g., HVAC control events) detected by the control unit server 510. The monitoring application server 560 also may receive information regarding events (e.g., HVAC events) from the one or more user devices 540 and 550.

In some examples, the monitoring application server 560 may route HVAC data received from the network module 514 or the one or more user devices 540 and 550 to the central alarm station server 570. For example, the monitoring application server 560 may transmit the HVAC data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit server 510 or the one or more user devices 540 and 550.

The central alarm station server 570 is an electronic device configured to provide alarm monitoring service by exchanging communications with the control unit server 510, the one or more mobile devices 540 and 550, and the monitoring application server 560 over the network 505. For example, the central alarm station server 570 may be configured to monitor HVAC events generated by the control unit server 510. In this example, the central alarm station server 570 may exchange communications with the network module 514 included in the control unit server 510 to receive information regarding HVAC events detected by the control unit server 510. The central alarm station server 570 also may receive information regarding HVAC events from the one or more mobile devices 540 and 550 and/or the monitoring application server 560.

The central alarm station server 570 is connected to multiple terminals 572 and 574. The terminals 572 and 574 may be used by operators to process HVAC events. For example, the central alarm station server 570 may route HVAC data to the terminals 572 and 574 to enable an operator to process the HVAC data. The terminals 572 and 574 may include general-purpose computers (e.g., desktop personal computers, workstations, or laptop computers) that are configured to receive HVAC data from a server in the central alarm station server 570 and render a display of information based on the HVAC data. For instance, the controller 512 may control the network module 514 to transmit, to the central alarm station server 570, HVAC data indicating that a sensor 520 detected a flow rate of air in the air handling unit 154. The central alarm station server 570 may receive the HVAC data and route the HVAC data to the terminal 572 for processing by an operator associated with the terminal 572. The terminal 572 may render a display to the operator that includes information associated with the HVAC event (e.g., the flow rate, the air duct the flow rate came from, the temperature of the air in the air duct, etc.) and the operator may handle the HVAC event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit server 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit server 510 using the communication link 538. For instance, the one or more user devices 540 and 550 may communicate with the control unit server 510 using various local wireless protocols such as Wi-Fi, Bluetooth, Zwave, Zigbee, HomePlug (ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit server 510, the one or more user devices 540 and 550 may communicate directly with the sensors and other devices controlled by the control unit server 510. In some implementations, the one or more user devices 540 and 550 replace the control unit server 510 and perform the functions of the control unit server 510 for local monitoring and long range/offsite communication.

In other implementations, the one or more user devices 540 and 550 receive monitoring system data captured by the control unit server 510 through the network 505. The one or more user devices 540, 550 may receive the data from the control unit server 510 through the network 505 or the monitoring application server 560 may relay data received from the control unit server 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit server 510 directly (e.g., through link 538) or through the monitoring application server 560 (e.g., through network 505) based on a location of the one or more user devices 540 and 550. For instance, when the one or more user devices 540 and 550 are located close to the control unit server 510 and in range to communicate directly with the control unit server 510, the one or more user devices 540 and 550 use direct communication. When the one or more user devices 540 and 550 are located far from the control unit server 510 and not in range to communicate directly with the control unit server 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, and the camera 530. The one or more user devices 540 and 550 receive data directly from the sensors 520, the module 522, and the camera 530 and sends data directly to the sensors 520, the module 522, and the camera 530. The one or more user devices 540, 550 provide the appropriate interfaces/processing to provide visual surveillance and reporting.

In other implementations, the system 500 further includes network 505 and the sensors 520, the module 522, the camera 530, and the thermostat 534 are configured to communicate sensor and image data to the one or more user devices 540 and 550 over network 505 (e.g., the Internet, cellular network, etc.). In yet another implementation, the sensors 520, the module 522, the camera 530, and the thermostat 534 (or a component, such as a bridge/router) are intelligent enough to change the communication pathway from a direct local pathway when the one or more user devices 540 and 550 are in close physical proximity to the sensors 520, the module 522, the camera 530, and the thermostat 534 to a pathway over network 505 when the one or more user devices 540 and 550 are farther from the sensors 520, the module 522, the camera 530, and the thermostat 534. In some examples, the system leverages GPS information from the one or more user devices 540 and 550 to determine whether the one or more user devices 540 and 550 are close enough to the sensors 520, the module 522, the camera 530, and the thermostat 534 to use the direct local pathway or whether the one or more user devices 540 and 550 are far enough from the sensors 520, the module 522, the camera 530, and the thermostat 534 that the pathway over network 505 is required. In other examples, the system leverages status communications (e.g., pinging) between the one or more user devices 540 and 550 and the sensors 520, the module 522, the camera 530, and the thermostat 534 to determine whether communication using the direct local pathway is possible. If communication using the direct local pathway is possible, the one or more user devices 540 and 550 communicate with the sensors 520, the module 522, the camera 530, and the thermostat 534 using the direct local pathway. If communication using the direct local pathway is not possible, the one or more user devices 540 and 550 communicate with the sensors 520, the module 522, the camera 530, and the thermostat 534 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising one or more computers and one or more storage devices on which are stored instructions that are operable, when executed by the one or more computers, to cause the one or more computers to perform operations comprising:

receiving, from a monitoring system that includes one or more sensors throughout a property with a heating, ventilation, and air conditioning ("HVAC") system at the property, raw sensor data that includes data from an alarm panel included in the monitoring system;

receiving, from the HVAC system at the property, HVAC system data that is different data from the raw sensor data;

determining, using the raw sensor data and the HVAC system data, whether a component of the HVAC system is likely malfunctioning;

in response to determining whether the component of the HVAC system is likely malfunctioning, generating a classification code that identifies a type of issue with the component; and performing an operation for the type of issue with the component of the HVAC system using the classification code, wherein the operation is separate from the operations.

2. The system of claim 1 wherein, the HVAC system data reflects at least one attribute of the HVAC system.

3. The system of claim 1, the operations comprising training a machine learning algorithm using the HVAC system data and raw sensor data, wherein determining, using the raw sensor data and the HVAC system data, whether a component of the HVAC system is likely malfunctioning comprises:

determining, using the raw sensor data and the HVAC system data and the machine learning algorithm, whether a component of the HVAC system is likely malfunctioning.

4. The system of claim 1, the operations comprising training a machine learning algorithm using the HVAC system data, raw sensor data, and historical data from the HVAC system, wherein determining, using the raw sensor data and the HVAC system data, whether a component of the HVAC system is likely malfunctioning comprises:

determining, using the raw sensor data, the HVAC system data, the historical data, and the machine learning algorithm, whether a component of the HVAC system is likely malfunctioning.

5. The system of claim 1 wherein, the raw sensor data comprises one or more of motion detector data, proximity data, thermal data, or data from house products.

6. The system of claim 1 wherein, the raw sensor data comprises one or more of media data, audio data, or thermal imaging data.

7. The system of claim 1, wherein the raw sensor data comprises data representing energy consumption of the HVAC system, efficiency of the HVAC system, or environmental settings.

8. The system of claim 1 the operations comprising, providing for display on a device, the classification code that identifies a type of issue with the component.

9. The system of claim 8 where the device is a cell phone.

10. The system of claim 1 wherein the raw sensor data includes data captured by an airflow sensor.

11. A computer implemented method comprising:

receiving, from a monitoring system that includes one or more sensors throughout a property with a heating, ventilation, and air conditioning ("HVAC") system at the property, raw sensor data that includes data from an alarm panel included in the monitoring system;

receiving, from the HVAC system at the property, HVAC system data that is different data from the raw sensor data;

determining, using the raw sensor data and the HVAC system data, whether a component of the HVAC system is likely malfunctioning;

in response to determining whether the component of the HVAC system is likely malfunctioning, generating a classification code that identifies a type of issue with the component; and performing an operation for the type of issue with the component of the HVAC system using the classification code, wherein the operation is separate from the operations.

12. The method of claim 11 wherein, the HVAC system data reflects at least one attribute of the HVAC system.

13. The method of claim 11, comprising training a machine learning algorithm using the HVAC system data and raw sensor data, wherein determining, using the raw sensor data and the HVAC system data, whether a component of the HVAC system is likely malfunctioning comprises:

determining, using the raw sensor data and the HVAC system data and the machine learning algorithm, whether a component of the HVAC system is likely malfunctioning.

14. The method of claim 11, comprising training a machine learning algorithm using the HVAC system data, raw sensor data, and historical data from the HVAC system, wherein determining, using the raw sensor data and the HVAC system data, whether a component of the HVAC system is likely malfunctioning comprises:

determining, using the raw sensor data, the HVAC system data, the historical data, and the machine learning algorithm, whether a component of the HVAC system is likely malfunctioning.

15. The method of claim 11 wherein, the raw sensor data comprises one or more of motion detector data, proximity data, thermal data, or data from house products.

16. The method of claim 11 wherein, the raw sensor data comprises one or more of media data, audio data, or thermal imaging data.

17. The method of claim 11 wherein, the raw sensor data comprises data representing energy consumption of the HVAC system, efficiency of the HVAC system, or environmental settings.

18. The method of claim 11 comprising, providing for display on a device, the classification code that identifies a type of issue with the component.

19. One or more computer storage media encoded with instructions that, when executed by one or more computers, cause the one or more computers to perform operations comprising:

receiving, from a monitoring system that includes one or more sensors throughout a property with a heating, ventilation, and air conditioning ("HVAC") system at the property, raw sensor data that includes data from an alarm panel including in the monitoring system;

receiving, from the HVAC system at the property, HVAC system data that is different data from the raw sensor data;

determining, using the raw sensor data and the HVAC system data, whether a component of the HVAC system is likely malfunctioning;

in response to determining whether the component of the HVAC system is likely malfunctioning, generating a classification code that identifies a type of issue with the component; and performing an operation for the type of issue with the component of the HVAC system using the classification code, wherein the operation is separate from the operations.

20. The method of claim 1, wherein the classification code includes one or more of a code, a textual description, or a number.

* * * * *